United States Patent [19]

Yamashita et al.

[11] Patent Number: 5,438,859
[45] Date of Patent: Aug. 8, 1995

[54] ACCELERATION SENSOR HAVING FAULT DIAGNOSING DEVICE

[75] Inventors: Muneharu Yamashita; Jun Tabota; Toshihiro Mizuno; Jiro Inoue, all of Nagaokakyo, Japan

[73] Assignee: Murata Manufacturing Co. Ltd., Japan

[21] Appl. No.: 950,478

[22] Filed: Sep. 24, 1992

[30] Foreign Application Priority Data

| Sep. 24, 1991 | [JP] | Japan | 3-243299 |
| Oct. 2, 1991 | [JP] | Japan | 3-255284 |
| Nov. 29, 1991 | [JP] | Japan | 3-316203 |
| Dec. 27, 1991 | [JP] | Japan | 3-346735 |
| Feb. 3, 1992 | [JP] | Japan | 4-17627 |

[51] Int. Cl.⁶ .................................. G01P 15/09
[52] U.S. Cl. ............................ 73/1 D; 73/514.34
[58] Field of Search ............ 73/1 D, 497, 517 R; 280/735; 310/315, 316, 326, 329, 338, 340

[56] References Cited

U.S. PATENT DOCUMENTS

| 2,471,143 | 5/1949 | Cress | 310/315 |
| 3,233,466 | 2/1966 | Shaw, Jr. | 73/517 R |
| 3,479,536 | 11/1969 | Norris | 73/517 R |
| 3,733,590 | 5/1973 | Kaufman | 310/326 |
| 4,155,257 | 5/1979 | Wittke | 73/497 |
| 4,197,478 | 4/1980 | Silvus, Jr. | 310/316 |
| 4,459,505 | 7/1984 | Lim | 310/318 |
| 4,510,411 | 4/1985 | Hakamata et al. | 310/316 |
| 4,573,357 | 3/1986 | Meunier | 73/517 R |
| 4,608,506 | 8/1986 | Tanuma | 310/315 |
| 4,612,453 | 9/1986 | Yamazaki | 340/652 |
| 4,653,326 | 3/1987 | Danel et al. | 73/517 R |
| 4,676,104 | 6/1987 | Cullen | 73/517 R |
| 4,700,973 | 10/1987 | Gademann et al. | |
| 4,950,914 | 8/1990 | Kurihara et al. | 280/735 |
| 5,130,600 | 7/1992 | Tomita et al. | 73/654 |
| 5,157,268 | 10/1992 | Spies et al. | 280/735 |
| 5,239,871 | 8/1993 | Reidemeister et al. | 73/497 |

FOREIGN PATENT DOCUMENTS

| 340476 | 11/1989 | European Pat. Off. | 73/517 R |
| 22912 | 2/1983 | Japan | 73/517 R |
| 96340 | 6/1986 | Japan | 310/329 |
| 144576 | 7/1986 | Japan | 73/517 R |
| 134961 | 6/1988 | Japan | 73/517 R |
| 206663 | 8/1988 | Japan | 73/517 R |
| 7879 | 1/1990 | Japan | 310/315 |
| 15707 | 1/1990 | Japan | 310/326 |
| 248865 | 10/1990 | Japan | 73/517 R |
| 2569 | 1/1991 | Japan | 73/517 R |
| 2174500 | 11/1986 | United Kingdom | 73/517 R |
| 2225433 | 5/1990 | United Kingdom | 73/517 |
| 2239096 | 6/1991 | United Kingdom | 73/1 D |

*Primary Examiner*—Hezron E. Williams
*Assistant Examiner*—Daniel S. Larkin
*Attorney, Agent, or Firm*—Ostrolenk, Faber, Gerb & Soffen

[57] ABSTRACT

An acceleration sensor includes a piezoelectric element for outputting an electric signal corresponding to acceleration applied thereto, a signal processor for processing a signal outputted from the piezoelectric element, an AC signal outputting device for receiving an externally inputted signal and generating an AC signal which is synchronized with the period of the timing signal in response to receipt of the timing signal and for applying the AC signal to the piezoelectric element, and a capacitor connected between the AC signal outputting device and the piezoelectric element for detecting a fault in the acceleration sensor.

13 Claims, 16 Drawing Sheets

$d_{31}$ = PIEZOELECTRIC STRESS CONSTANT AT REFERENCE TEMPERATURE (20°C IN THIS CASE)

$Qs$ = CAPACITANCE OF PIEZOELECTRIC ELEMENT AT REFERENCE TEMPERATURE

ACCELERATION SENSOR HAVING FAULT DIAGNOSING DEVICE

BACKGROUND OF THE INVENTION

1. Field of the Invention

The present invention relates generally to an acceleration sensor for use in an air bag device carried by an automobile, and more particularly, to an acceleration sensor having a fault diagnostic device.

2. Description of the Prior Art

In an air bag device carried by an automobile, the air bag device operated in response to acceleration applied at the time of, for example, a collision. In order to ensure the operation of the air bag device, an acceleration sensor has been conventionally incorporated in the above described air bag device. As this type of acceleration sensor, an acceleration sensor using a piezoelectric element which is deformed in response to acceleration applied thereto to output an electric signal has been proposed, as disclosed in, for example, U.S. Pat. No. 4,700,973.

One example of a conventionally known acceleration sensor utilizing a piezoelectric element will be described with reference to FIGS. 1 to 3.

FIG. 1 is a schematic block diagram for explaining the construction of a conventional acceleration sensor. There is provided a piezoelectric element 1 outputting, when acceleration G is applied, an electric signal corresponding to the acceleration G. An impedance converter means 2 is electrically connected to the piezoelectric element 1. The impedance converter 2 converts the impedance of the electric signal applied from the piezoelectric element 1. A filter 3 having a band-pass filter is electrically connected to the impedance converter 2. In the filter 3, an unnecessary signal, that is, an out-of-band signal component is attenuated. An amplifier 4 is electrically connected to the filter 3. In the amplifier 4, an output signal applied from the filter 3 is amplified. This acceleration sensor has the piezoelectric element 1, the impedance converter 2, the filter 3 and the amplifier 4, and output a voltage signal corresponding to the acceleration G from an output terminal B.

The voltage signal outputted from the output terminal B of the acceleration sensor is applied to a control unit 5 comprising a microcomputer arranged outside the acceleration sensor. The control unit 5 causes an air bag device for an automobile (not shown) to perform a necessary operation on the basis of the voltage signal applied.

FIGS. 2 and 3 are respectively a plan sectional view showing the specific construction of the above described acceleration sensor and a cross sectional view taken along a line 3—3 shown in FIG. 2. In an acceleration sensor 6, a base plate and a cap 8 secured to the upper surface of the base plate constitute a package structure containing a housing space. Within the package structure, a hybrid IC 9 is secured on the base plate 7 using adhesives (not shown). The hybrid IC 9 is used for constructing the impedance converter 2, the filter 3 and the amplifier 4 described above. A plurality of electrodes 9a to 9f for connection to outer portions are formed on the upper surface of the hybrid IC 9. Each of the electrodes 9a to 9d is electrically connected to a lead terminal 11 by a lead wire 10. A plurality of lead terminals 11 are passed through the base plate 7 and are extended downward.

On other hand, a supporting base 12 is secured on the base plate 7 using adhesives (not shown) beside the hybrid IC 9. A piezoelectric element 1 having electrodes (not shown) on both its major surfaces is secured on the supporting base 12 in a cantilevered shape. The electrode on the upper surface of the piezoelectric element 1 is electrically connected to the electrode 9f by a lead wire 10f, and the electrode on the lower surface of the piezoelectric element 1 is electrically connected to the supporting base 12. In addition, the supporting base 12 is electrically connected to the electrode 9e on the hybrid IC 9 by a lead wire 10e.

The above described piezoelectric element 1 has a series type bimorph structure which is low in piezoelectric voltage.

Meanwhile, the above described package structure constituted by the base plate 7 and the cap 8 is hermetically sealed, and an inert gas, for example, nitrogen gas is sealed into the package structure so as to prevent oxidation. When the above described acceleration sensor is incorporated in the air bag device for an automobile, the air bag device is operated in response to an output signal of the acceleration sensor. Accordingly, the acceleration sensor requires very high reliability, and a fault in the acceleration sensor must be quickly detected. Since a fault diagnostic function has not been conventionally added to the acceleration sensor itself, however, the fault diagnosis of the acceleration sensor is generally made by an outer fault diagnostic device which is provided separately from the acceleration sensor. When there occurs a fault such as the cracking of the piezoelectric element 1 in the acceleration sensor or the stripping of the piezoelectric element 1 from the supporting base 12, the fault may not, in some cases, be quickly found out because the acceleration sensor does not have a fault self-diagnostic function.

Furthermore, the conventional acceleration sensor 6 shown in FIGS. 2 and 3 also has the following disadvantages. That is, when an excessive shock is externally given, there occurs a state where the supporting base 12 fixed to the base plate 7 using adhesives is stripped from the base plate 7 and the piezoelectric element 1, along with the supporting base 12, is not fixed to the other members, as represented by an imaginary line in FIG. 3. Accordingly, acceleration cannot, in some cases, be accurately detected by the piezoelectric element 1. Even if such a fault occurs, the electrical connection between the piezoelectric element 1 and the hybrid IC 9 is ensured through the lead wires 10e and 10f so long as the piezoelectric element 1 is fixed to the supporting base 12, so that the occurrence of the fault may not, in some cases, be detected.

SUMMARY OF THE INVENTION

Therefore, the present invention has been made so as to overcome the above described disadvantages of the conventional acceleration sensor. Thus, and object of the present invention is to provide an acceleration sensor capable of reliably detecting the occurrence of a fault.

In accordance with an aspect of the present invention, there is provided an acceleration sensor including a piezoelectric element outputting an electric signal corresponding to acceleration applied, a signal processor electrically connected to the above described piezoelectric element and for processing the electric signal outputted from the piezoelectric element, an AC signal outputting device electrically connected to the above described piezoelectric element so as to generate an AC signal which is synchronized with the period of a timing signal externally inputted in response to the timing signal and to apply the AC signal to the piezoelectric element, and a capacitor connected between the above described AC signal outputting device and the piezoelectric element.

Furthermore, in accordance with another aspect of the present invention, there is provided an acceleration sensor including an acceleration detecting portion having a piezoelectric element having electrodes on both its major surfaces and outputting an electric signal corresponding to acceleration applied and a supporting base for supporting the above described piezoelectric element, the acceleration detecting portion being further provided with a pair of detecting portions arranged so as to be brought into contact with the piezoelectric element and spaced apart from each other by a predetermined distance, a signal processor electrically connected to one of the electrodes of the piezoelectric element and for processing the signal outputted from the piezoelectric element, and a signal outputting device electrically connected to one of the above described pair of detecting portions so as to cause a predetermined current to flow between the above described detecting portions and electrically connected to the above described signal processor so as to output to the above described signal processor a state signal representing the state of the acceleration detecting portion, the signal outputting device outputting the above described state signal in conformity with the variation of the current flowing between the detecting portions.

In each of the acceleration sensors provided in accordance with the above described two aspects of the present invention, a fault self-diagnostic function is provided in the acceleration sensor, as apparent from the embodiments described later. Even when there occurs a fault such as the cracking of the piezoelectric element or the stripping of the piezoelectric element from a portion to which the piezoelectric element is fixed, therefore, the fault which occurred can be quickly detected.

In accordance with still another aspect of the present invention, there is provided an acceleration sensor including a piezoelectric element outputting an electric signal corresponding to acceleration applied, and a signal processor electrically connected to the above described piezoelectric element and for processing the output signal of the piezoelectric element, at least a part of the above described signal processor being constituted by an electronic component having a flat upper surface, the above described piezoelectric element being fixed to the upper surface of the electronic component in a cantilevered arrangement.

Furthermore, in accordance with a particular aspect of the present invention, an electrode for making connection to the piezoelectric element is formed on the upper surface of the above described electronic component, and the piezoelectric element is electrically connected to the electrode and is fixed to the upper surface of the electronic component. In this case, the area of a portion to which the piezoelectric element is fixed on the upper surface of the electronic component is smaller than the area of a portion to which the electronic component itself is fixed. Accordingly, when a shock or the like is applied, not the electronic component but the piezoelectric element supported on the electronic component is stripped from the electronic component. As a result, the electrical connection between the piezoelectric element and the electronic component is interrupted, thereby to make it possible to quickly detect a fault caused by the stripping of the piezoelectric element.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
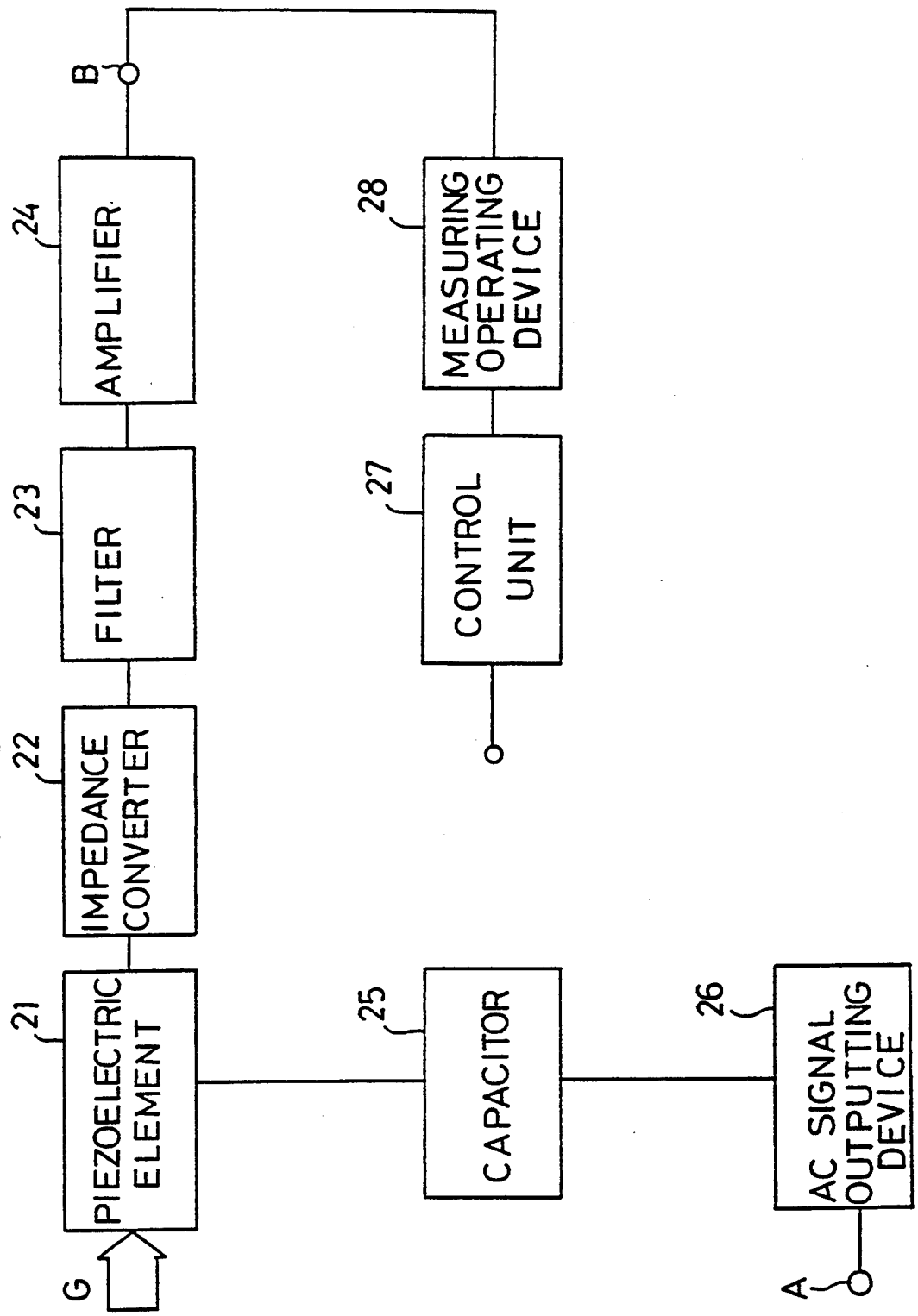
FIG. 4 is a schematic block diagram for explaining an acceleration sensor according to a first embodiment of the present invention.
Figure 5:
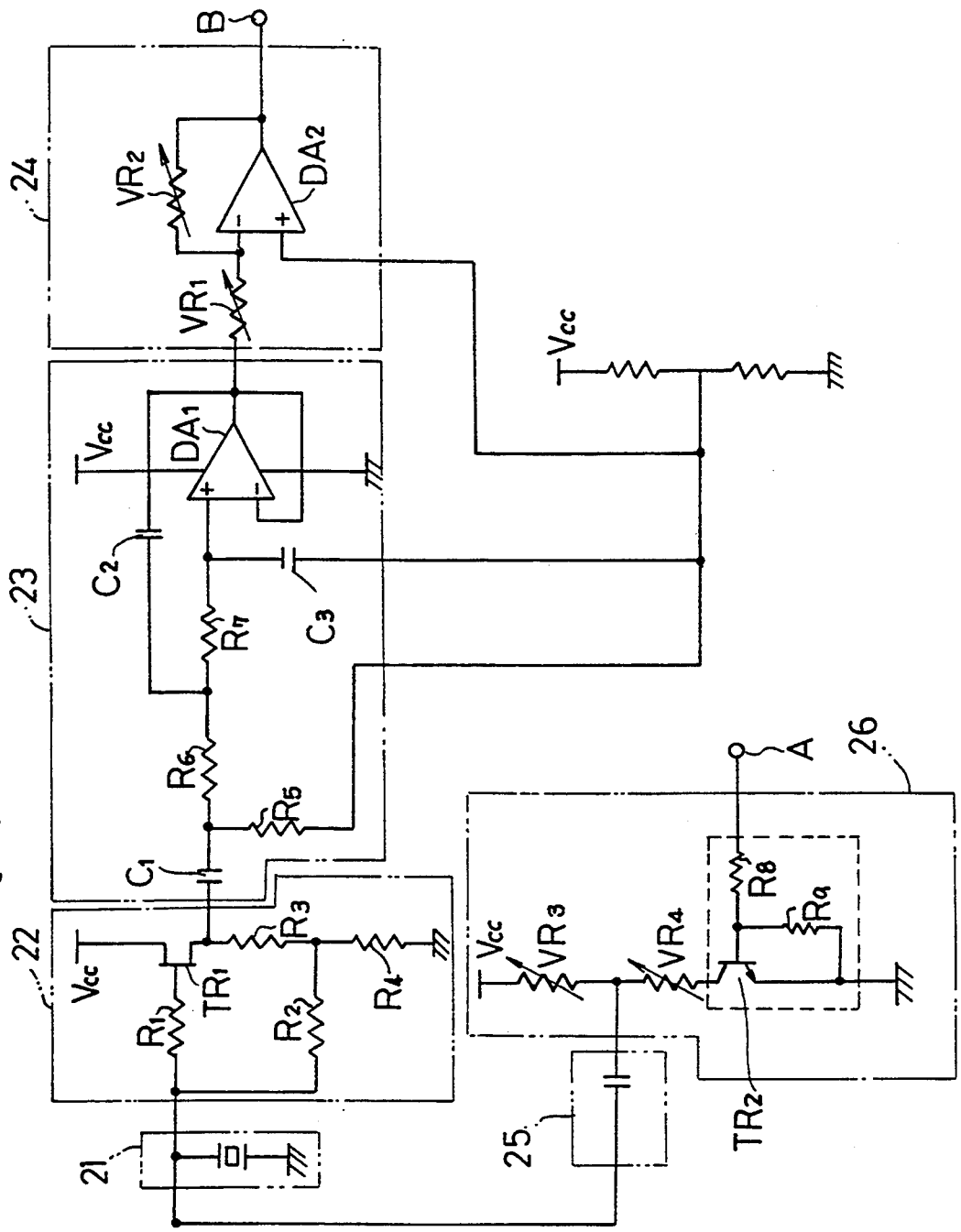
FIG. 5 is a circuit diagram for explaining the circuit arrangement of the acceleration sensor according to the first embodiment.

FIG. 4 is a schematic block diagram for explaining the construction of an acceleration sensor according to a first embodiment of the present invention, and FIG. 5 is a circuit diagram showing one example of an electric circuit of the acceleration sensor.

As shown in FIGS. 4 and 5, in the acceleration sensor according to the present embodiment, there is provided a piezoelectric element 21 outputting an electric signal corresponding to acceleration G. As the piezoelectric element 21, a piezoelectric element having a series type bimorph structure having electrodes on both its major surfaces, for example, is used because it is low in pyroelectric voltage. The piezoelectric element 21 is deformed in conformity with the acceleration G applied thereto to output an electric signal corresponding to the deformation. One of the electrodes of the piezoelectric element 21 is connected to a reference potential, as shown in FIG. 5. The other electrode of the piezoelectric element 21 is electrically connected to an impedance converter 22. The impedance converter 22 is provided so as to convert the impedance of the electric signal applied from the piezoelectric element 21 so that the impedance matches the impedance of the other circuit elements. The impedance convertor 21 can be constituted by, for example, a field effect transistor $TR_1$ and resistors $R_1$ to $R_4$ shown in FIG. 5.

A filter 23 is provided in the succeeding stage of the impedance converter 22. The filter 23 includes a bandpass filter for attenuating or removing an unnecessary signal component, and can be constituted by, for example, an operational amplifier $D_{A1}$, resistors $R_5$ to $R_7$ and capacitors $C_1$ to $C_3$ as shown in FIG. 5.

An Amplifier 24 is provided in the succeeding stage of the filter 23 so as to amplify an output signal applied from the filter 23. The amplifier 24 can be constituted by, for example, an operational amplifier $D_{A2}$ and variable resistors $VR_1$ and $VR_2$ as shown in FIG. 5.

The impedance converter 22, the filter 23, and the amplifier 24 constitute a signal processor according to the present invention. An output terminal B of the amplifier 24 is an output terminal of the acceleration sensor according to the present embodiment.

On the other hand, an AC signal outputting device 26 is electrically connected to the electrode, to which the impedance converter 22 is electrically connected, of the piezoelectric element 21 through a capacitor 25. The AC signal outputting device has an input terminal A, and a timing signal as described later is externally inputted to the input terminal A. The AC signal outputting device 26 is so constructed that an AC signal which is synchronized with the period of the timing signal inputted is outputted and the AC signal is applied to the piezoelectric element 21 through the capacitor 25. The AC signal outputting device 26 can be constituted by, for example, a transistor $TR_2$, resistors $R_8$ and $R_9$, and variable resistors $VR_3$ and $VR_4$ as shown in FIG. 5.

Description is now made of a fault diagnostic operation in the acceleration sensor according to the first embodiment described with reference to FIGS. 4 and 5. The fault diagnosis is made in cases, for example, a case where the acceleration sensor is used for an air bag device carried by an automobile and a case immediately before an automobile is driven. That is, when the engine of an automobile is started, for example, an instruction to start a fault diagnostic operation is issued to the acceleration sensor from an outer control unit 27 (see FIG. 4).

When the fault diagnostic operation is started, a timing signal having a frequency $f_1$ within a passband of the filter 23 is first outputted to the input terminal A of the AC signal outputting device 26 from the control device 27. When the above described timing signal is inputted to the input terminal A, the AC signal outputting device 25 outputs an AC signal which is synchronized with the period of the timing signal. The AC signal is applied to the piezoelectric element 21 through the capacitor The piezoelectric element 21 has a certain capacitance value. Accordingly, the capacitance value of the piezoelectric element 21 is taken as $Q_1$, the capacitance value of the capacitor 25 is taken as $Q_2$, and a voltage of the AC signal outputted from the AC signal outputting device 26 is taken as $V_1$. In this case, a voltage $V_2$ applied to the impedance converter 22 is expressed by the following equation:

$$V_2 = V_1 \cdot Q_2/(Q_1+Q_2) \qquad \ldots (I)$$

A voltage signal having the above described voltage $V_2$ is impedance-converted in the impedance converter 22 to an impedance that matches that of the other circuit elements, and an unnecessary signal component is attenuated or removed in the filter 23. The voltage signal is amplified by the amplifier 24 and is outputted as a voltage signal $V_S$ from the output terminal B.

In this case, the AC signal outputting device 26 is previously adjusted so that the voltage signal $V_3$ having a constant value is outputted from the output terminal B by inputting the timing signal having a frequency $f_1$. This adjustment can be made by, for example, adjusting the variable resistors $VR_3$ and $VR_4$ in the circuit shown in FIG. 5.

The voltage signal $V_3$ outputted from the output terminal B of the acceleration sensor according to the present embodiment as described above is received in a measuring and operating device 28 incorporated in the microcomputer.

On the other hand, when the above described voltage signal $V_3$ is outputted from the output terminal B, a timing signal having a frequency $f_2$ outside the passband of the filter 23 is continuously applied to the input terminal A of the AC signal outputting device 26. The above described same operation is repeated. In this case, the frequency $f_2$ of the timing signal inputted is outside the passband of the filter 23, so that a voltage signal $V_4$ attenuated by the filter 23 and amplified by the amplifier 24 is outputted from the output terminal B. The voltage signal $V_4$ is also received in the measuring and operating device 28.

Furthermore, in the above described measuring and operating device 28, the respective variations of the voltage signal $V_3$ corresponding to the timing signal having a frequency $f_1$ and the voltage signal $V_4$ corresponding to the timing signal having a frequency $f_2$ are measured. The fault diagnosis of the acceleration sensor is made by comparing the measured values of $V_3$ and $V_4$ with normal values of $V_3$ and $V_4$ stored in the microcomputor.

In the acceleration sensor according to the present embodiment, the piezoelectric element 21 and signal processor including the impedance converter 22, the filter 23 and the amplifier 24 are connected in series, as apparent from FIG. 4. Even when an abnormality occurs in any structure, therefore, either one of the voltage signals $V_3$ and $V_4$ varies. Consequently, a fault can be quickly detected.

Meanwhile, it has been generally considered that cracking occurring in the piezoelectric element 21 itself is not easily detected. In the acceleration sensor according to the present embodiment, however, when the piezoelectric element 21 is cracked, the capacitance value $Q_1$ thereof is changed, so that the voltage $V_2$ applied to the impedance converter 22 varies, as apparent from the foregoing equation (I). Consequently, the voltage signals $V_3$ and $V_4$ vary, thereby to make it possible to reliably detect the cracking of the piezoelectric element 1.

As described in the foregoing, in the acceleration sensor according to the present embodiment, the fault diagnostic function is added to the acceleration sensor by arranging the capacitor 25 between the AC signal outputting device 26 for outputting the AC signal which is synchronized with the period of the timing signal externally inputted and the piezoelectric element 21. Accordingly, a fault diagnostic device need not be provided outside the acceleration sensor, unlike the conventional acceleration sensor.

It will be pointed out that the construction of a third embodiment described hereafter is applicable as the specific construction of the above described first embodiment.

Figure 6:
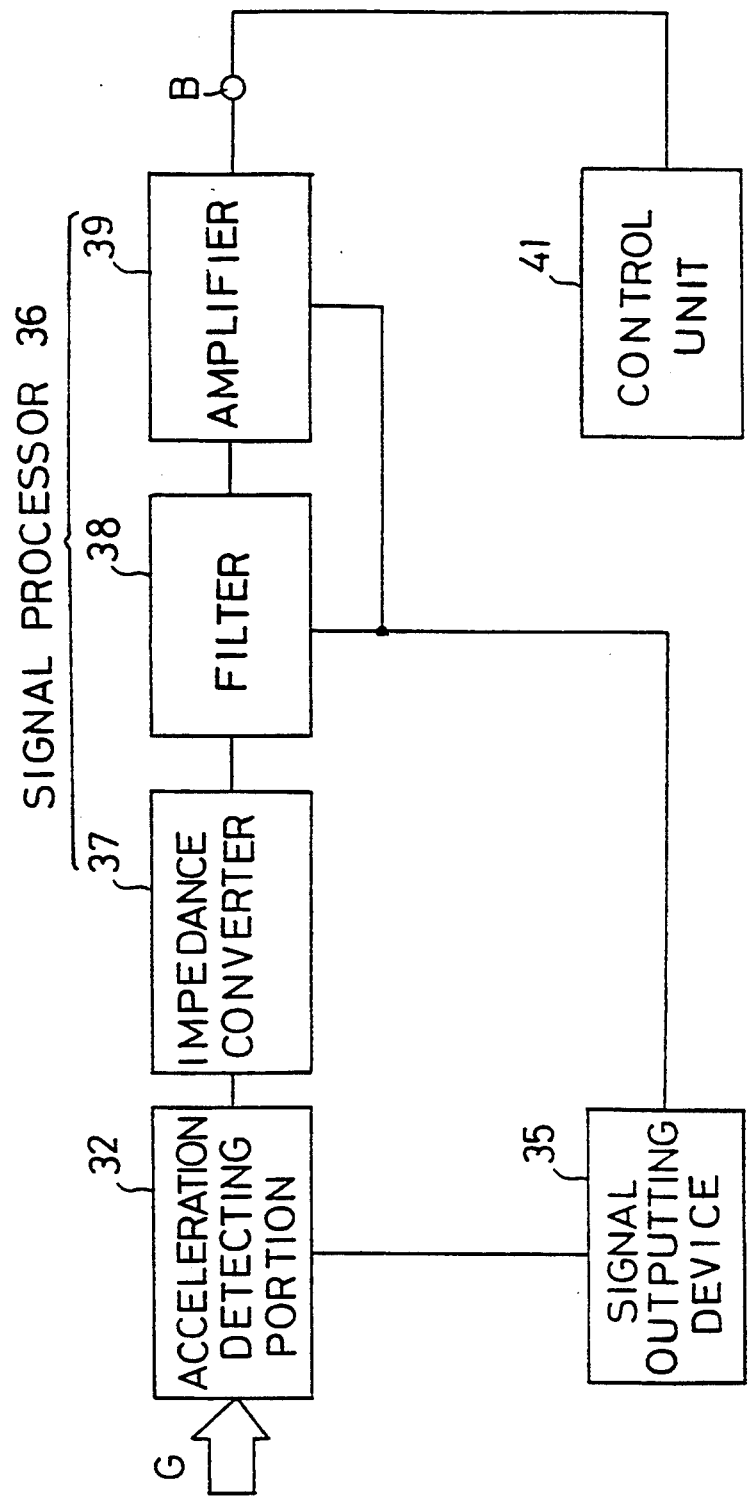
FIG. 6 is a schematic block diagram for explaining the construction of an acceleration sensor according to a second embodiment of the present invention.
Figure 7:
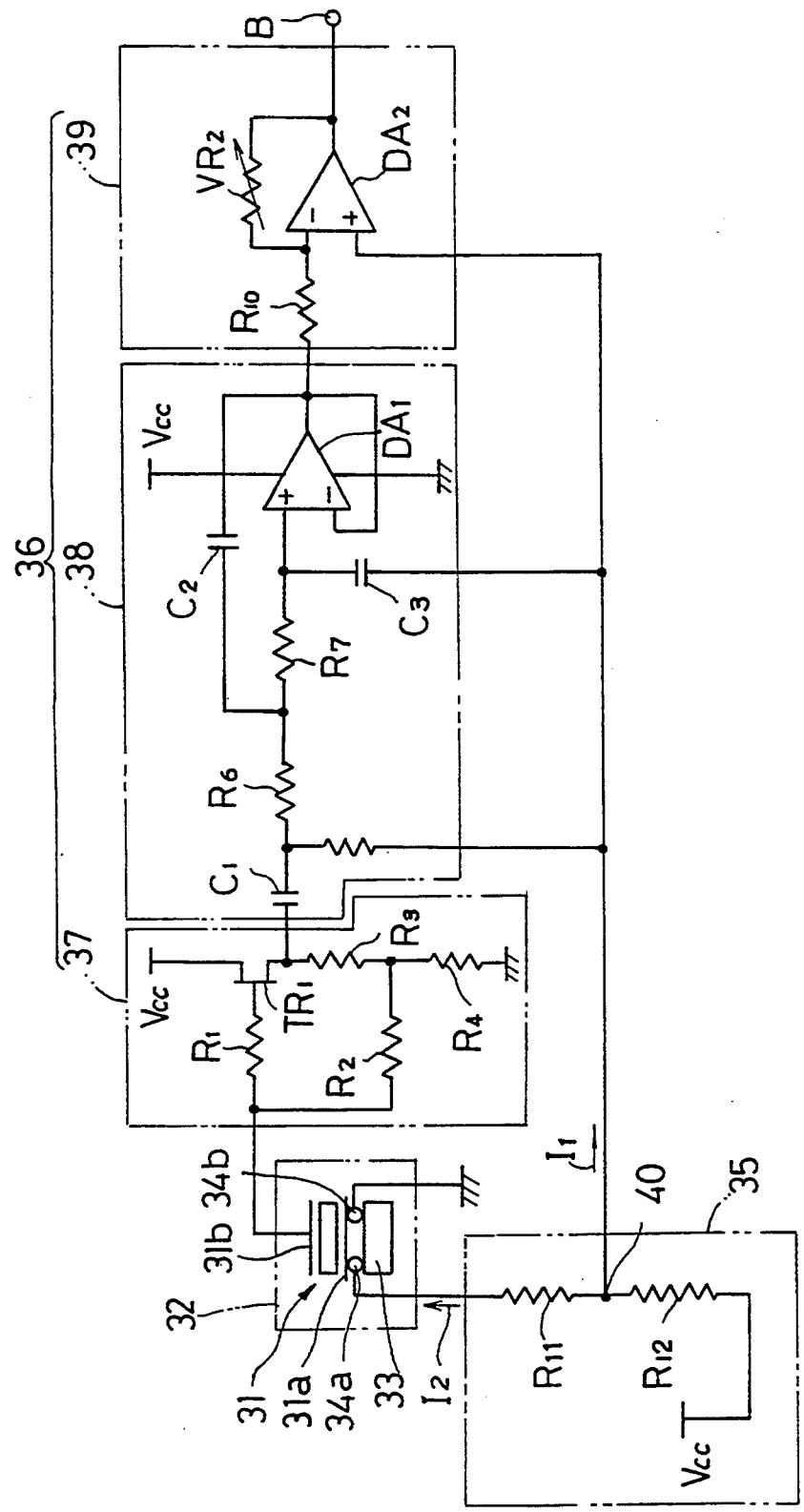
FIG. 7 is a circuit diagram for explaining the acceleration sensor according to the second embodiment.

FIGS. 6 and 7 are respectively a block diagram for explaining the schematic construction of an acceleration sensor according to a second embodiment of the present invention and an electric circuit diagram showing one example of the specific circuit arrangement of the acceleration sensor.

Referring to FIG. 5, there is provided an acceleration detecting portion 32 in the present embodiment. The acceleration detecting portion 32 includes a piezoelectric element 31 having electrodes 31a and 31b on both its major surfaces, as shown in FIG. 7. As the piezoelectric element 31, a piezoelectric element having a series type bimorph structure which is low in pyroelectric voltage is preferably used, as in the first embodiment. The piezoelectric element 31 is fixed on a supporting base 33, as schematically shown in FIG. 7. A pair of detecting portions 34a and 34b is formed spaced apart from each other by a predetermined distance on the upper surface of the supporting base 33, and the pair of detecting portions 34a and 34b is electrically connected to the electrode 31a of the piezoelectric element 31. One of the detecting portions 34a is electrically connected to signal outputting device 35 as described hereafter. The other detecting portion 34b is electrically connected to a reference potential. The specific construction of the acceleration detecting portion 32 will be described hereafter with reference to, for example, FIG. 8.

As can be seen from FIG. 7, the other electrode 31b of the piezoelectric element 31 is electrically connected to a signal processor 36. That is, as shown in FIG. 6, the acceleration detecting portion 32 is electrically connected to the signal processor 36 so that an output of the acceleration detecting portion 32 is applied to the signal processor 36. The signal processor 36 includes a impedance converter means 37, a filter 38, and an amplifier 39. The impedance converter 37 is provided so as to convert the impedance of a voltage signal applied from the acceleration detecting portion 32, to an impedance that matches that of the other circuit elements. The filter 38 includes a band-pass filter and is provided so as to attenuate or remove an out-of-band signal component, and the amplifier 39 is provided so as to amplify a voltage signal applied from the filter 38. Although one example of the specific construction of the signal processor 36 is as shown in FIG. 7, it can be constructed in approximately the same manner as the impedance converter 22, the filter 23 and the amplifier 24 in the above described first embodiment. In FIG. 7, therefore, the same circuit elements as the circuit elements shown in FIG. 5 are assigned the same reference numerals and hence, the description thereof is not repeated.

The signal outputting device 35 is connected to a power supply voltage Vcc, and is constituted by resistors $R_{11}$ and $R_{12}$ connected in series to each other. A node 40 between the resistors $R_{11}$ and $R_{12}$ is electrically connected to the signal processor 56.

Figure 8:
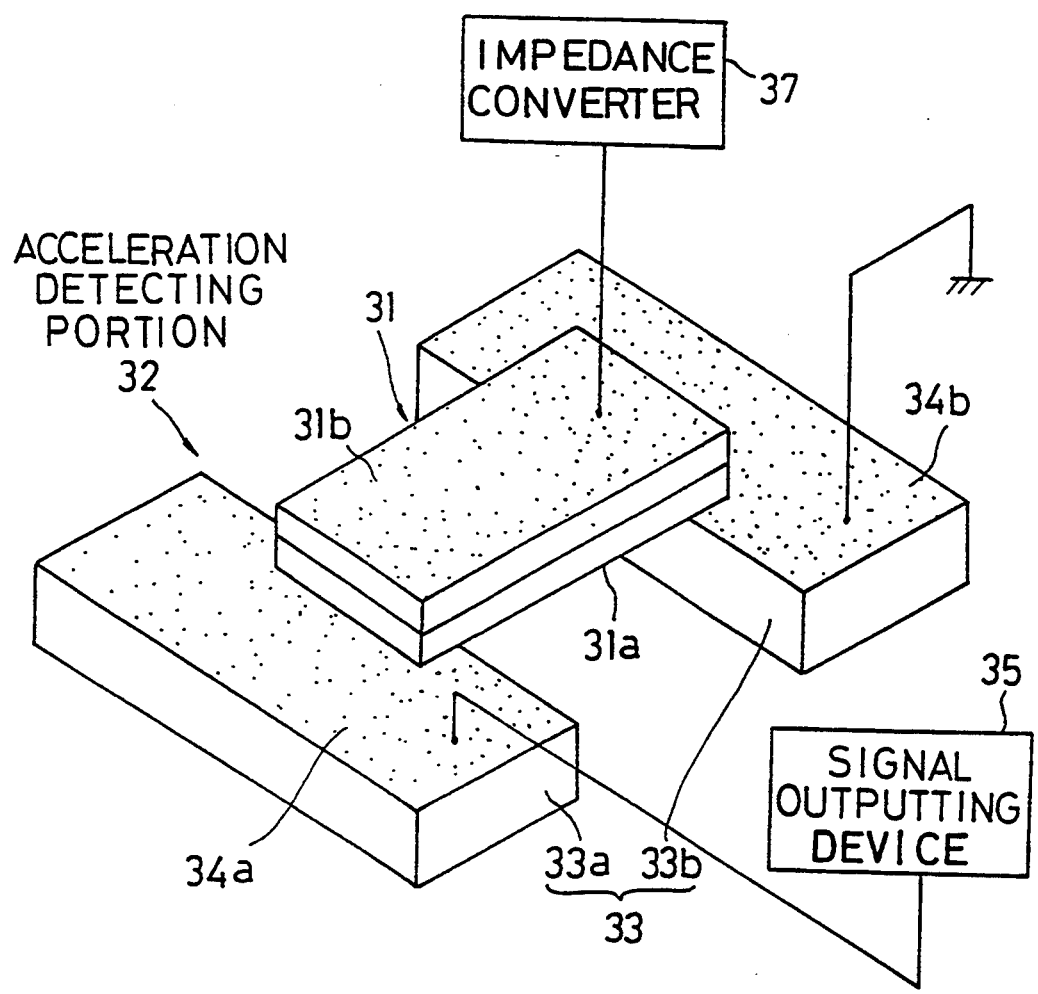
FIG. 8 is a perspective view for explaining the relationship between a supporting base and a piezoelectric element in the acceleration sensor according to the second embodiment.

The specific construction of the above described acceleration detecting portion 32 will be described with reference to FIG. 8. A supporting base 33 is constituted by a pair of supporting members 33a and 33b arranged spaced apart from each other by a predetermined distance. Detecting portions 34a and 34b are formed on the respective supporting members 33a and 33b by applying electrode films. That is, the pair of detecting portions 34a and 34b is arranged spaced apart from each other by a predetermined distance. A piezoelectric element 31 is fixed on the detecting portions 34a and 34b with one of electrodes 31a on the bottom, and the electrode 31a is electrically connected to the detecting portions 54a and 34b. The signal outputting device 35 is electrically connected to the detecting portion 34a, as shown in FIG. 8, and the detecting portion 34b is connected to a reference potential.

A fault diagnostic operation in the acceleration sensor according to the second embodiment will be described with reference to FIGS. 7 and 8.

In the acceleration sensor according to the second embodiment as described above, the signal outputting device 35 is connected in series to a predetermined potential source, and includes a pair of resistors $R_{11}$ and $R_{12}$ for dividing the power supply voltage Vcc. In addition, respective input terminals of the filter 38 and the amplifier 39 are electrically connected to the node 40 between the resistors $R_{11}$ and $R_{12}$. On the other hand, one of the above described detecting portions 34a is electrically connected to the downstream side of the resistors $R_{11}$ and $R_{12}$. Consequently, a predetermined current $I_1$ flows from the node 40 to the filter 38 and the amplifier 39, and a predetermined current $I_2$ flows from the downstream side of the resistors $R_{11}$ and $R_{12}$ to the detecting portion 34a.

Figure 11A:
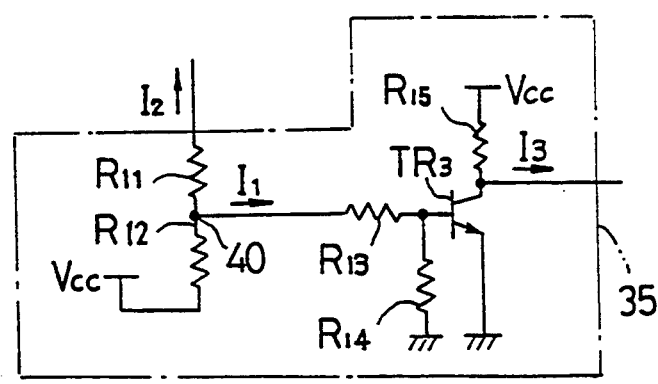
FIG. 11A is an electric circuit diagram showing a modified example of signal outputting means.

The above described signal outputting device 35 may be constructed, as in a modified example shown in FIG. 11A. That is, the signal outputting device 35 may be so constructed that a circuit having resistors $R_{13}$ to $R_{15}$ and a transistor $TR_3$ is provided in the succeeding stage of the node 40 between the resistors $R_{11}$ and $R_{12}$, and a current $I_3$ corresponding to the predetermined current $I_1$ from the node 40 is applied to respective input terminals of the filter 38 and the amplifier 39.

Meanwhile, in the above described acceleration detecting portion 32, the detecting portions 34a and 34b are electrically connected to each other by the electrode 31a on the lower surface of the piezoelectric element 31, as apparent from FIG. 8. Consequently, a predetermined current $I_2$ applied from the above described signal outputting device 35 flows between the detecting portions 34a and 34b. That is, the current 12 flowing between the detecting portions 34a and 34b is always monitored by the signal processor 36. If the current $I_2$ varies, the current $I_1$ flowing from the node 40 between the resistors $R_{11}$ and $R_{12}$ varies in conformity with the variation of the current $I_2$.

Accordingly, in, for example, a case where the piezoelectric element S1 is cracked or the piezoelectric element 31 is stripped from the supporting base 33, the current $I_2$ flowing between the detecting portions 34a and 34b varies, so that the current $I_2$ is reduced or does not flow. As a result, the current $I_1$ flowing from the node 40 between the resistors $R_{11}$ and $R_{12}$ varies. Accordingly, a state signal representing the state of the acceleration detecting portion 32, that is, the cracking or the stripping of the piezoelectric element 31 constituting the acceleration detecting portion 32 is outputted from the signal outputting device 35 to the filter 38 and the amplifier 39 constituting the signal processor means 36 in conformity with the variation in value of the above described current $I_2$. Consequently, a signal outputted outward from the output terminal B of the acceleration sensor varies, thereby to make it possible to make the diagnosis of a fault in the acceleration sensor by the variation of the output signal in a control unit 41 connected to the output terminal B.

Figure 9:
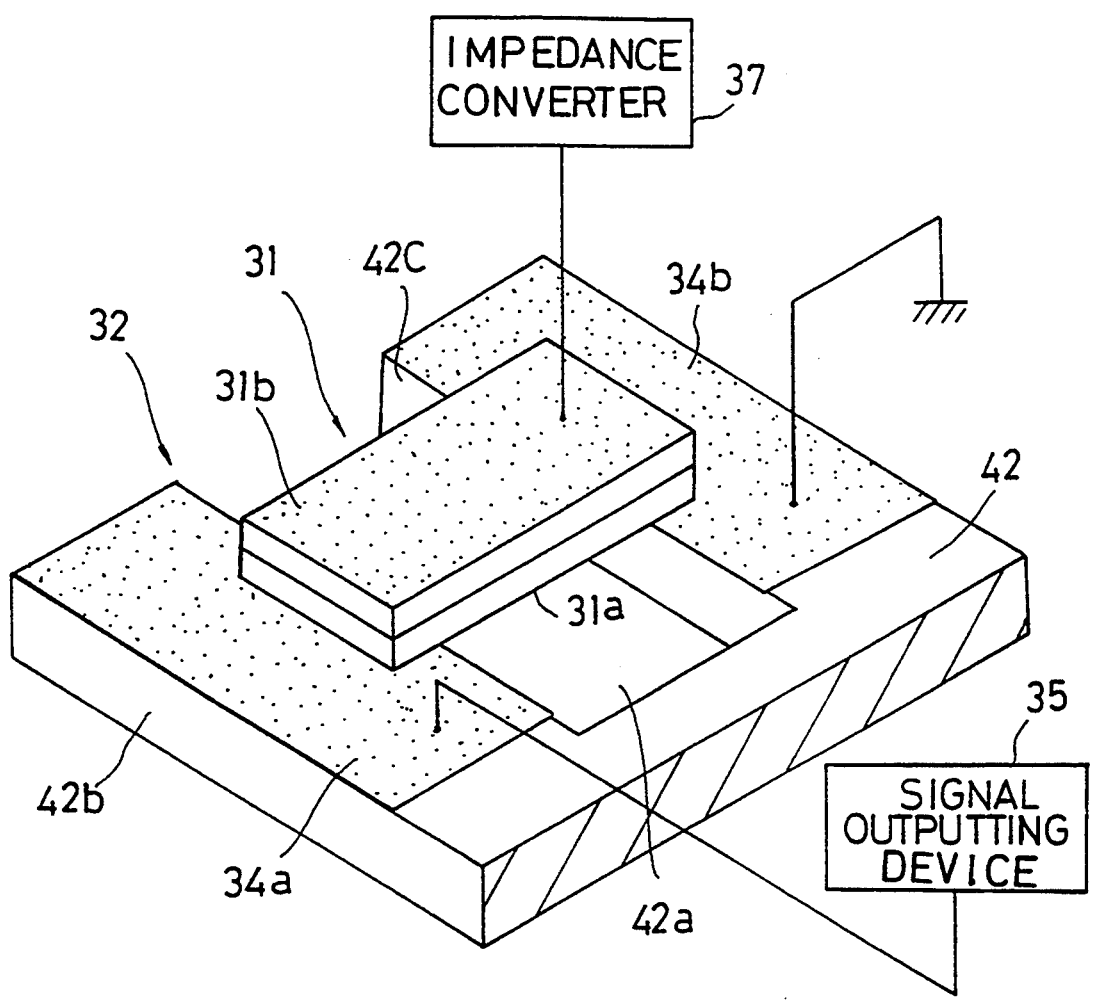
FIG. 9 is a perspective view showing the relationship between a piezoelectric element and a supporting base in a modified example of the second embodiment.

Although in the construction shown in FIG. 8, the supporting base 33 constituting the acceleration detecting portion 32 includes a pair of supporting members 33a and 33b, and the electrode films constituting the detecting portions 34a and 34b are applied to the upper surfaces of the supporting members 33a and 33b, the detecting portions 34a and 34b may be provided separately from the electrode films formed on the supporting members 33a and 33b. In addition, the detecting portions 34a and 34b need not be respectively provided between the piezoelectric element and the supporting members 33a and 33b. For example, the detecting portions 34a and 34b may be arranged spaced apart from each other by a predetermined distance in another portion of the piezoelectric element Furthermore, the construction of the acceleration detecting portion 32 is not limited to the construction shown in FIG. 8. For example, the signal processor 36 and the like in the acceleration sensor according to the present embodiment can be usually incorporated in a single electronic component, for example, a hybrid IC. Consequently, as shown in FIG. 9, the supporting base 33 may be replaced with a hybrid IC 42. In the construction shown in FIG. 9, a notch 42a is formed in the center of the hybrid IC 42, a pair of supporting portions 42b and 42c is formed on both sides thereof, and detecting portions 34a and 34b are formed on the upper surface of the pair of the supporting portions 42b and 42c by applying electrode films. A piezoelectric element 31 is bonded and fixed on the detecting portions 34a and 34b with conductive adhesives. Consequently, an electrode 31a formed on one major surface of the piezoelectric element 31 is electrically connected to the electrode films constituting the detecting portions 34a and 34b.

Figure 10:
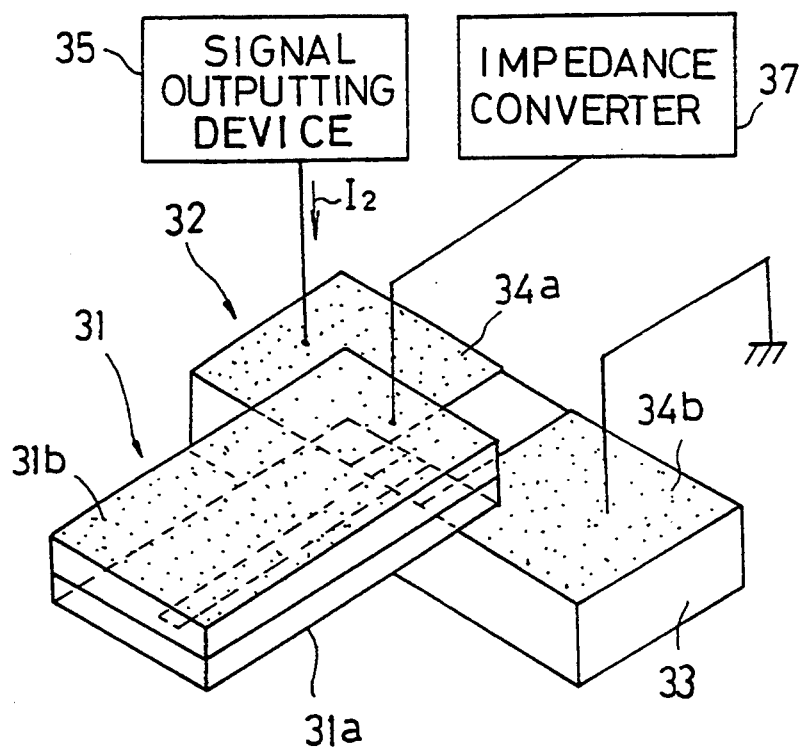
FIG. 10 is a perspective view showing the relationship between a piezoelectric element and a supporting base in another modified example of the second embodiment.

Furthermore, as shown in FIG. 10, a piezoelectric element 31 may be fixed on a supporting base 33 in a cantilevered arrangement using conductive adhesives. In the construction shown in FIG. 10, a pair of electrode films is formed spaced apart from each other by a predetermined distance on the upper surface of the supporting base 33, thereby to constitute detecting portions 34a and 34b. On the other hand, an electrode 31a on the lower surface of the piezoelectric element 31 is formed to have a substantially U shape by cutting away its central part as represented by a broken line in FIG. 10, and both ends of the electrode 31a having a substantially U shape are electrically connected to the by detecting portions 34a and 34b, respectively.

Figure 11B:
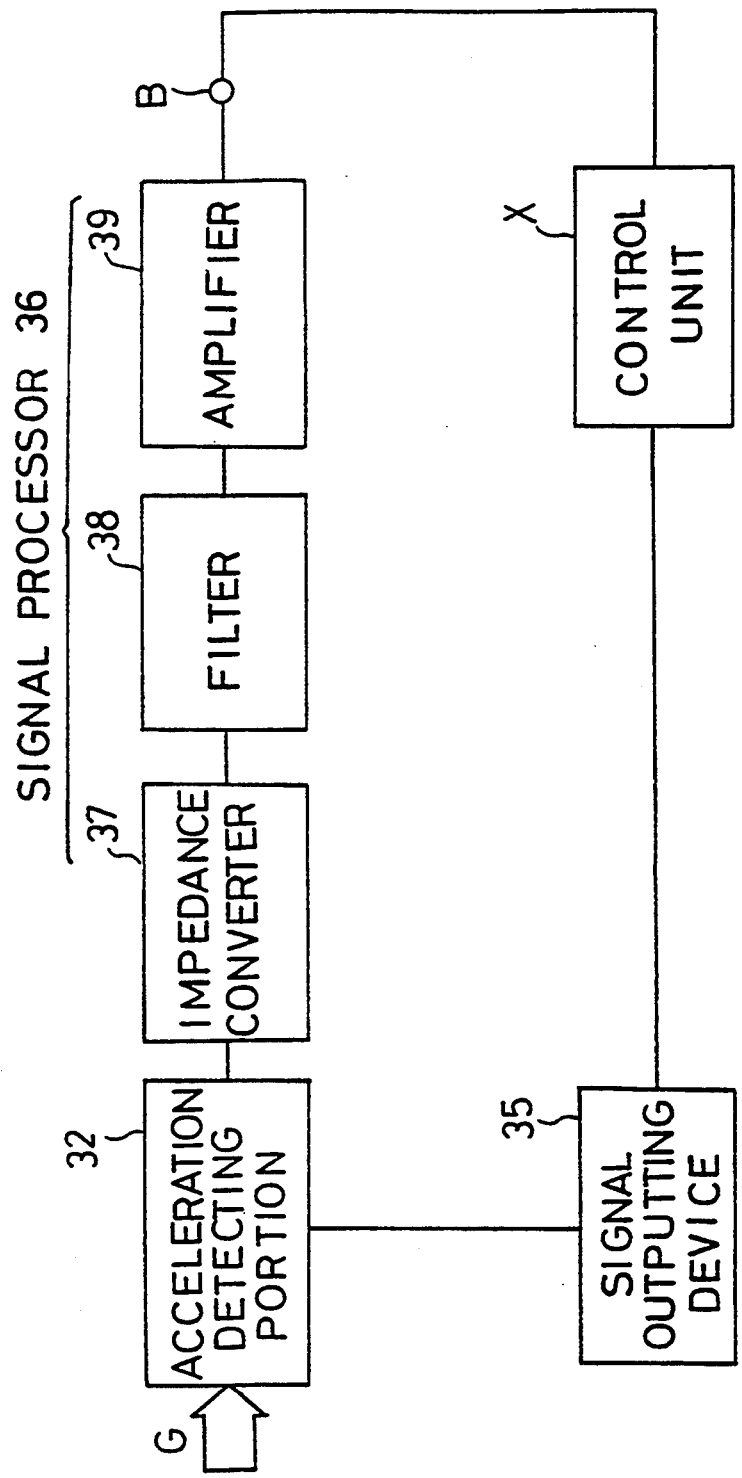
FIG. 11B is a schematic block diagram for explaining a modified example of the second embodiment.

Although in the foregoing description of the second embodiment, the filter 38 and the amplifier 39 constituting the signal processor 36 are electrically connected to the node 40 between the resistors $R_{11}$ and $R_{12}$ constituting the signal outputting device 35, the present invention is not limited to the same. That is, as shown in FIG. 11B, a fault in the acceleration detecting portion 32 may be diagnosed by directly connecting the signal outputting device 35 and control device X to each other, applying a current from the above described node 40 to the control unit X, and comparing the voltage signal applied from the output terminal B of the acceleration sensor and the state signal applied from the signal outputting device 35 with each other in the control device X.

As described in the foregoing, the acceleration sensor according to the second embodiment includes the signal outputting device for outputting to the signal processor the state signal representing the state of the acceleration detecting portion 32 including the piezoelectric element 31 and the supporting base 33, and the pair of detecting portions arranged spaced apart from each other by a predetermined distance in the acceleration detecting portion 32. The signal outputting device is constructed to output the above described state signal according to the variation of the current flowing between the detecting portions 34a and 34b. Accordingly, when there occurs a fault such as the cracking of the piezoelectric element constituting the acceleration detecting portion or the stripping of the piezoelectric element from the supporting base, the current flowing between the above described detecting portions 34a and 34b varies, so that the state signal corresponding to the above described variation of the current is outputted from the signal outputting device, thereby to make it possible to quickly detect the fault which occurred.

Consequently, also in the second embodiment, it is possible to reliably detect a fault, which has been conventionally difficult to detect, such as the cracking of the piezoelectric element or the stripping of the piezoelectric element from the supporting base.

Figure 12:
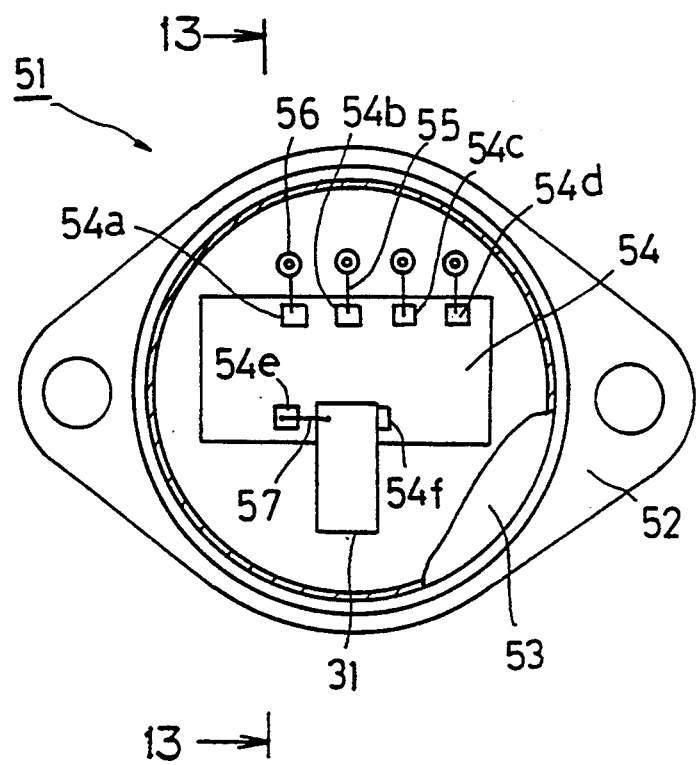
FIG. 12 is a plan sectional view showing an acceleration sensor according to a third embodiment of the present invention.
Figure 13:
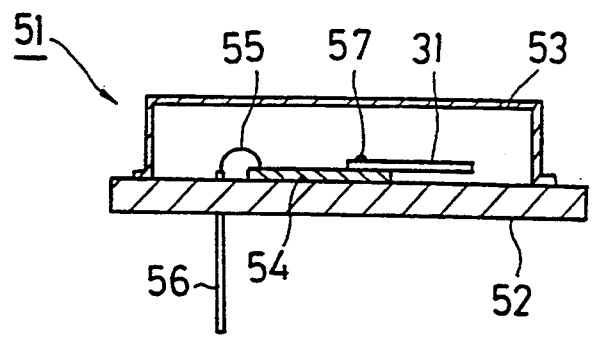
FIG. 13 is a cross sectional view taken along a line 13—13 shown in FIG. 12.

FIGS. 12 and 13 are respectively a plan sectional view for explaining an acceleration sensor according to a third embodiment of the present invention and a schematic cross sectional view taken along a line 13—13 shown in FIG. 12. The third embodiment is characterized by a supporting structure of a piezoelectric element. Both the circuit arrangements in the above described first embodiment and second embodiment are applicable to the circuit arrangement in the third embodiment, and the acceleration sensor can be specifically constructed also in the first embodiment and the second embodiment using the construction of the third embodiment.

Referring to FIGS. 12 and 13, an acceleration sensor 51 includes a base plate 52 and a cap 53 secured to the upper surface of the base plate 52 at the peripheral edge, and the base plate 52 and the cap 53 constitute a package structure. In a housing space constituted by the base plate 52 and the cap 53, a hybrid IC 54 is fixed on the base plate 52 using adhesives (not shown). The hybrid IC 54 has a structure containing the signal processor, the AC signal outputting device 26 and/or signal outputting device 35, and the like in the first and second embodiments. That is, in the third embodiment, circuit portions such as the signal processor device, the signal outputting device 35 and/or the AC signal outputting device 26, and the like are constructed by using the hybrid IC 54 serving as a single electronic component.

The upper surface of the hybrid IC 54 is made flat, and electrodes 54a to 54f for connection to outer portions are formed on the upper surface. Each of the electrodes 54a to 54d is electrically connected to a lead terminal 56 by a lead wire 55. The lead terminal 56 is passed through the base plate 52 and is extended downward from the base plate 52 in a state where it is electrically insulated from the base plate 52.

On the other hand, the electrode 54e is electrically connected to an electrode 31b on the upper surface of a piezoelectric element 31 by a lead wire 57. In addition, the piezoelectric element 31 is directly secured to the upper surface of the hybrid IC 54 with conductive adhesives, and an electrode 31a on the lower surface of the piezoelectric element 31 is electrically connected to the electrode 54f with the above described conductive adhesives.

Figure 1:
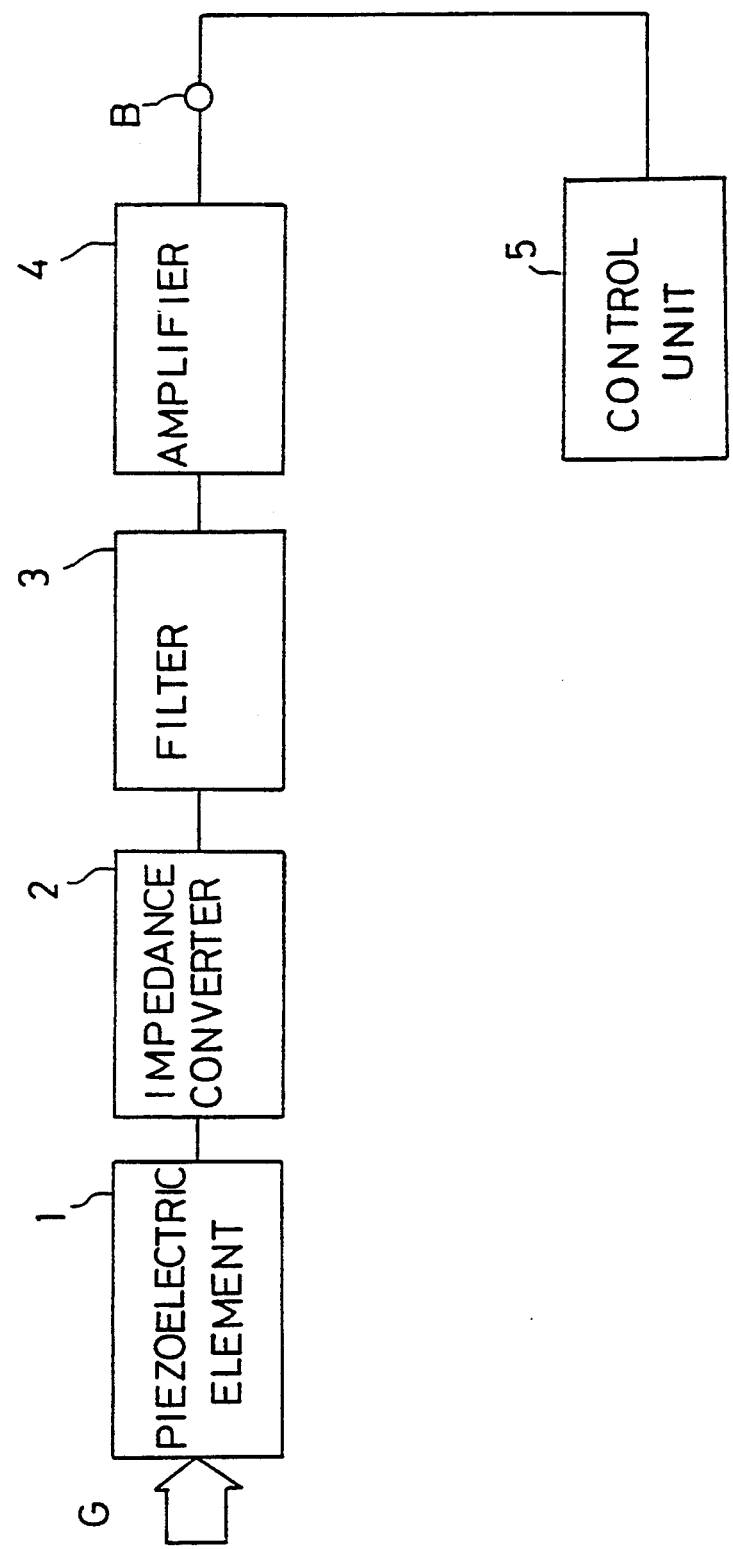
FIG. 1 is a schematic block diagram for explaining the construction of a conventional acceleration sensor.
Figure 2:
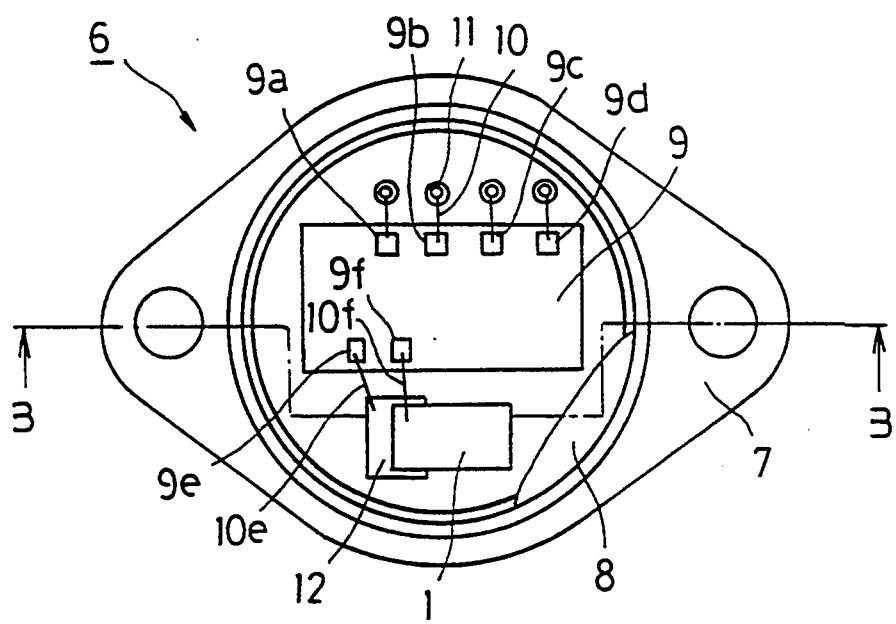
FIG. 2 is a plan sectional view for explaining the construction of the conventional acceleration sensor.
Figure 3:
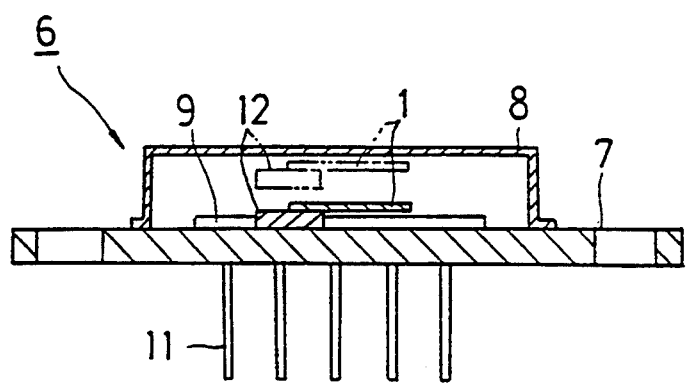
FIG. 3 is a cross sectional view taken along a line 3—3 shown in FIG. 2.

The area of the bottom surface of the hybrid IC 54 is made larger than the area of the bottom surface of the supporting base 12 in the conventional acceleration sensor shown in FIG. 2. That is, the hybrid IC 54 used for this type of application usually has an area of base larger than that of the supporting base 12 shown in FIG. 2. Consequently, the hybrid IC 54 can be secured to the base plate 52 more firmly, as compared with the supporting base 12 shown in FIG. 2. Accordingly, in the acceleration sensor 51 according to the third embodiment, the hybrid IC 54 is more difficult to strip from the base plate 52, as compared with the supporting base 12 shown in FIG. 2, thereby to effectively prevent such a failure that the piezoelectric element and a member supporting the piezoelectric element are stripped from the base plate.

Furthermore, in the construction shown in FIGS. 12 and 13, the piezoelectric element 31 is secured to the upper surface of the hybrid IC 54 in a cantilevered arrangement. Consequently, when a large mechanical shock is applied, the hybrid IC 54 is not stripped from the base plate 52 but the piezoelectric element 31 is stripped from the upper surface of the hybrid IC 54 before the stripping. As a result, the electrical connection between the electrode 31a on the lower surface of the piezoelectric element 31 and the electrode 54f on the hybrid IC 54 shown in FIG. 12 is released, thereby to break an electric circuit. Consequently, when such a fault occurs, the occurrence of the fault is immediately detected by the operation of a fault self-diagnostic circuit incorporated in the hybrid IC 54.

Although in FIGS. 12 and 13, the piezoelectric element 31 is secured to the flat upper surface of the hybrid IC 54 in a cantilevered arrangement, the piezoelectric element 31 may be secured to the upper surface of the hybrid IC in such arrangement that its both ends are supported thereon, as in the modified example shown in FIG. 9 of the second embodiment.

Figure 14:
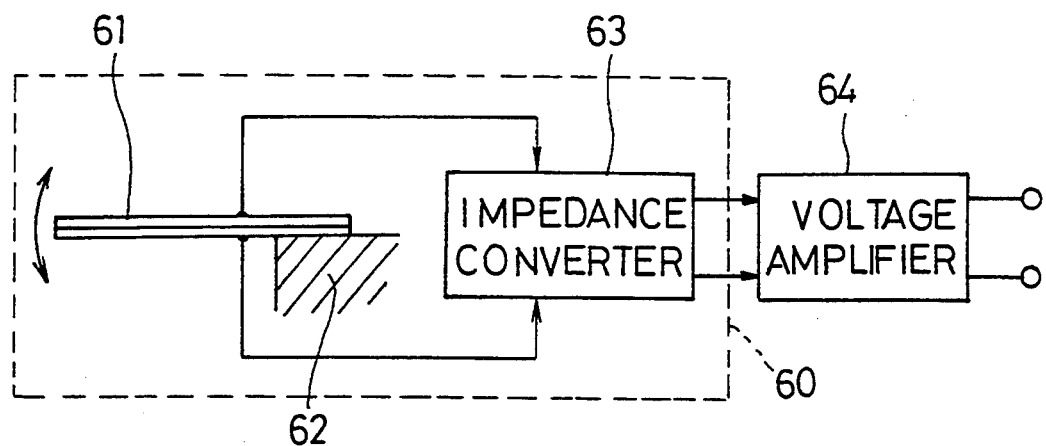
FIG. 14 is a schematic block diagram showing main portions of the conventional acceleration sensor.
Figure 15:
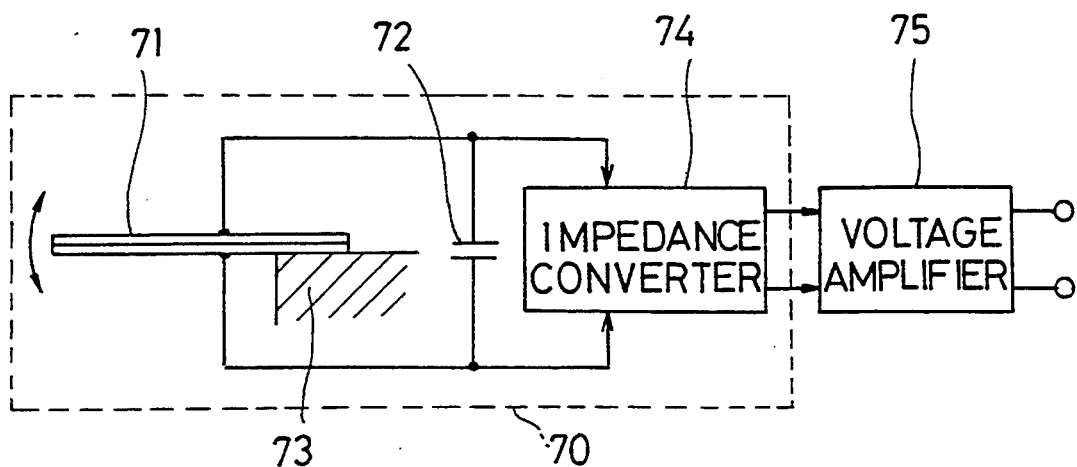
FIG. 15 is a schematic block diagram showing main portions of an acceleration sensor according to a fourth embodiment of the present invention.
Figure 16:
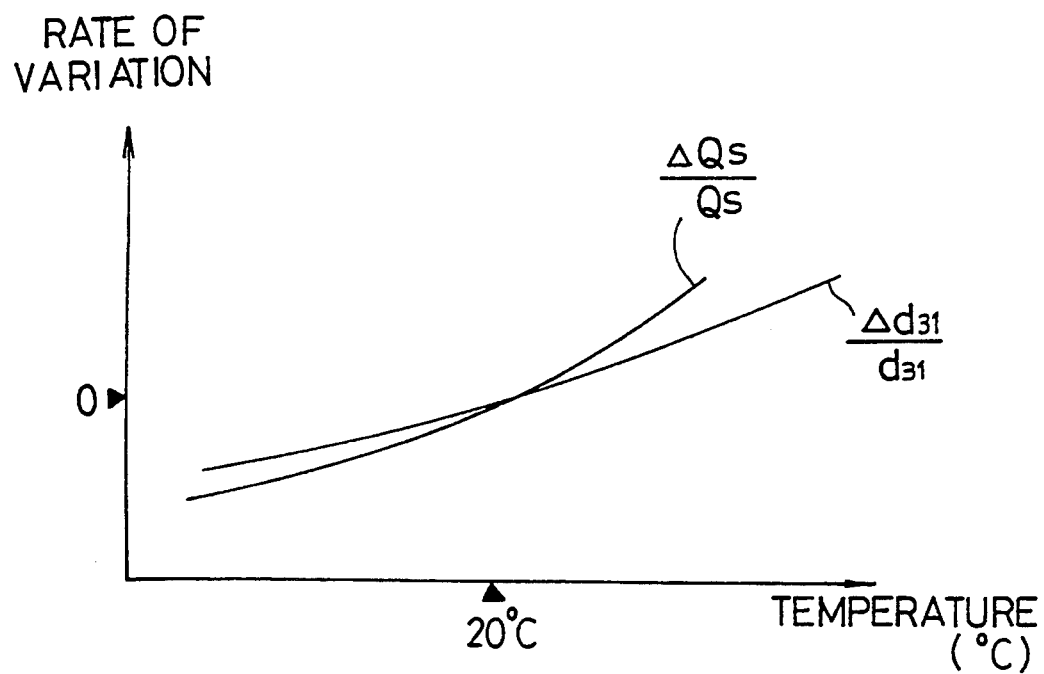
FIG. 16 is a diagram showing the temperature dependence of the rate of variation of piezoelectric stress constant of a piezoelectric element and the rate of variation of capacitance thereof.

Description is now made of an acceleration sensor according to a fourth embodiment of the present invention with reference to FIGS. 14 to 16. The acceleration sensor according to the fourth embodiment is characterized in that a temperature compensating capacitor is connected in parallel to a piezoelectric element. The constructions of the first to third embodiments are applicable to the other structures without any modification. In other words, the temperature compensating capacitor used in the fourth embodiment is used in the constructions of the first to third embodiments without any modification, thereby to make it possible to produce the function and effect described hereafter.

In an acceleration sensor using a piezoelectric element, an output voltage of the piezoelectric element is affected by the ambient temperature. Accordingly, temperature compensation has been conventionally achieved using a voltage amplifier. More specifically, in the conventional acceleration sensor, a piezoelectric element 61 is fixed on a supporting base 62 in a cantilevered shape within a case 60 represented by a broken line, as shown in FIG. 14. In addition, an impedance converter 63 is connected to the piezoelectric element 61, and a voltage amplifier 64 arranged outside the case 60 is connected to the impedance converter 63. In the voltage amplifier 64, the temperature compensation of the piezoelectric element 61 is achieved.

However, the ambient temperature of the voltage amplifier 64 does not necessarily coincide with the ambient temperature of the piezoelectric element 61. Consequently, there arises the problem of making it impossible to achieve proper temperature compensation. On the other hand, the inventors of the present application have found that temperature compensation can be suitably achieved if a temperature compensating capacitor 72 is connected in parallel to a piezoelectric element 71 in close proximity to the piezoelectric element 71. In FIG. 15, reference numeral 73 denotes a supporting base. The supporting base 73 may be replaced with an electronic component such as the above described hybrid IC. In addition, reference numeral 74 denotes an impedance converter means, and reference numeral 75 denotes a voltage amplifier. The voltage amplifier 75 can be constructed similarly to the amplifier in the above described first and second embodiments. Consequently, the impedance converter 74 and the voltage amplifier 75 can be constructed as a single electronic component, for example, a hybrid IC within a case 70.

Description is now made of the reason why temperature compensation can be suitably achieved when the temperature compensating capacitor 72 is connected in parallel to the piezoelectric element 71.

Examination made by the inventors of the present application shows that the reason why an output voltage of the piezoelectric element is affected by the temperature is that the rate of variation of capacitance Q with temperature ($\Delta Qs/Qs$) and the rate of variation of piezoelectric stress constant $d_{31}$ with temperature ($\Delta d_{31}/d_{31}$) differ from each other. In this case, Qs indicates the capacitance of the piezoelectric element, and $d_{31}$ indicates the piezoelectric stress constant of the piezoelectric element in the 31 direction.

If the above described rate of variation of capacitance with temperature and the above described rate of variation of piezoelectric stress constant with temperature are equal to each other, the amount of change in output due to the change in piezoelectric stress constant is canceled by the amount of change in capacitance even if the temperature changes, thereby to make it possible to avoid the variation of the output voltage.

More specifically, when the output voltage of the piezoelectric element is taken as V, the rate of variation of output voltage in a case where the output voltage V is changed by $\Delta V$ due to the rise in unit temperature is $\Delta V/V$. "The output voltage V is not affected by the change in temperature" means that the above described rate of variation of output voltage becomes zero ($\Delta V/V = 0$).

If the rate of variation of output voltage ($\Delta V/V$) is found, therefore, the output voltage V of the piezoelectric element is proportional to a stress ($\alpha G$) produced by acceleration G at that time and the piezoelectric stress constant $d_{31}$ of the piezoelectric element, and is inversely proportional to the capacitance Qs of the piezoelectric element. That is, the following equation holds:

$$V = \alpha G \cdot d_{31}/Qs \quad \ldots (2)$$

On the other hand, the amount of change in output voltage $\Delta V$ is as follows:

$$\Delta V = (V + \Delta V) - V \quad \ldots (3)$$

Accordingly, the following equation holds:

$$\Delta V = \alpha G (d_{31} + \Delta d_{31})/(Qs + \Delta Qs) - \alpha G d_{31}/Qs \quad \ldots (4)$$

$\Delta d_{31}$ in the foregoing equation (4) indicates the amount of change per unit temperature in piezoelectric stress constant.

If the above described equations (2) and (4) are substituted in respective terms in the rate of variation of output voltage ($\Delta V/V$) to eliminate common terms, the following equation holds:

$$\Delta V/V = [1 + (\Delta d_{31}/d_{31})]/[1 + (\Delta Qs/Qs)] - 1 \quad \ldots (5)$$

In order that the rate of variation of output voltage becomes zero in the above described equation (5), that is, $\Delta V/V = 0$, the following equation may hold:

$$\Delta Qs/Qs = \Delta d_{31}/d_{31} \quad \ldots (6)$$

That is, it is found that the rate of variation of capacitance of the piezoelectric element and the rate of variation of piezoelectric stress constant thereof may be equal to each other.

In the temperature characteristics of the piezoelectric element, however, the rate of variation of piezoelectric stress constant $d_{31}$ ($\Delta d_{31}/d_{31}$) and the rate of variation of capacitance Qs ($\Delta Qs/Qs$) actually differ from each other, as shown in FIG. 16. Accordingly, an output voltage which is not affected by the change in temperature is not obtained.

Therefore, the inventors of the present application has found that if the above described temperature compensating capacitor 72 is connected in parallel to the piezoelectric element 71 in close proximity to the piezoelectric element 71, temperature compensation can be reliably achieved by selecting the capacitance of the capacitor 72.

More specifically, if the rate of variation of capacitance of the piezoelectric element ($\Delta Qs/Qs$) and the rate of variation of piezoelectric stress constant thereof ($\Delta d_{31}/d_{31}$) are equal to each other as shown in the equation (6), the rate of variation of output voltage of the piezoelectric element becomes zero ($\Delta V/V = 0$). In the fourth embodiment, however, if the capacitance Qt at the reference temperature of the capacitor 72 and the rate of variation of capacitance with temperature thereof ($\Delta Qt/Qt$) are suitably selected, the rate of variation of piezoelectric stress constant of a parallel circuit and the rate of variation of capacitance thereof are approximately equal to each other, thereby to obtain an output voltage which is not affected by the ambient temperature.

In the above described capacitor 72, the required capacitance Qt can be easily calculated as follows. That is, if the condition under which the rate of variation of output voltage becomes zero is found by the foregoing equation (6), the following equation holds because the total capacitance of a parallel circuit of the piezoelectric element 71 and the capacitor 72 is the sum of the capacitance of the piezoelectric element 71 and the capacitance of the capacitor 72:

$$(\Delta Qs + \Delta Qt)/(Qs + Qt) = \Delta d_{31}/d_{31} \quad \ldots (7)$$

If the equation (7) is changed for simplification, the following equation is obtained:

$$Qt/Qs = (\Delta Qs/Qs - \Delta d_{31}/d_{31})/(\Delta d_{31}/d_{31} - \Delta Qt/Qt) \quad \ldots (8)$$

The capacitance Qt of the capacitor 72 and the rate of variation of capacitance thereof ($\Delta Qt/Qt$) are unknown out of the respective terms in the equation (8). However, the rate of variation of capacitance of the capacitor 72 is determined depending on which type of capacitor is the capacitor 72. On the other hand, the other terms are all known.

Therefore, letting the capacitance Qs (at 20° C.) of the piezoelectric element 71 = 900 pF, the rate of variation of capacitance thereof ($\Delta Qs/Qs$) = 0.0036, and the rate of variation of piezoelectric stress constant thereof ($\Delta d_{31}/d_{31}$) = 0.0023, the required capacitance Qt of each of capacitors exhibiting the following characteristics UJ, RH and CG:

(1) In the capacitor having the characteristic UJ, the rate of variation of capacitance ($\Delta Qt/Qt$) is set to $-0.00075$, so that the required capacitance Qt of the capacitor 72 becomes 383.6 pF.

(2) In the capacitor having the characteristic RH, the rate of variation of capacitance ($\Delta Qt/Qt$) is set to $-0.00022$, so that the required capacitance of the capacitor 72 becomes 464.3 pF.

(3) In the capacitor having the characteristics CG, the rate of variation of capacitance ($\Delta Qt/Qt$) is set to approximately zero, so that the required capacitance Qt of the capacitor 72 becomes 508.7 pF.

As described above, the type of capacitor 72 used is suitably selected to find the value of the rate of variation of capacitance of the capacitor 72, and this value and the other known values are substituted in the above described equation (8) to find the required capacitance Qt of the capacitor 72.

Consequently, according to the fourth embodiment, the rate of variation of piezoelectric stress constant and the rate of variation of capacitance of the parallel circuit of the piezoelectric element and the capacitor can be made approximately equal to each other by only selecting the capacitance of the capacitor 72 connected in parallel to the piezoelectric element 71 in the above described manner. Consequently, even if the ambient temperature changes, the amount of change in output due to the change in piezoelectric stress constant is canceled by the amount of change in capacitance. As a result, an output voltage which is not affected by the ambient temperature is obtained. Since the above described capacitor 72 is provided in close proximity to the piezoelectric element 71, and the capacitor 72 is always operated at approximately the same temperature as the piezoelectric element 71, therefore, it is possible to accurately achieve temperature compensation.

Referring now to FIGS. 17 to 21, description is made of a fifth embodiment of the present invention. The fifth embodiment is characterized in that in an acceleration sensor, constructed so that an electronic component containing a signal processing circuit and the like is arranged on a base plate, a cushioning member for absorbing a thermal shock produced between the base plate and the above described electronic component due to the difference in coefficient of thermal expansion or modulus of elasticity is provided between the base plate and the electronic component. The cushioning member is also applicable to each of the acceleration sensors in the above described first to fourth embodiments. In the fifth embodiment, the thermal shock produced due to the difference in coefficient of thermal expansion or modulus of elasticity is absorbed by the above described cushioning member, so that an excessive thermal stress is not exerted on the electronic component for constructing a signal processor and the like. Consequently, the possibility of causing damages to the electronic component due to the thermal shock is prevented, thereby to enhance the reliability of the acceleration sensor.

Furthermore, the thermal shock is absorbed by the above described cushioning member. Accordingly, even if a wiring pattern or a resistor film is formed on the bottom surface of the above described electronic component, it is hardly damaged. Accordingly, it is possible to also form a more relieable wiring pattern or a resistor film on the bottom surface of the electronic component, thereby to make it possible for the electronic component used to be made smaller in size and higher in integration density.

Figure 17:
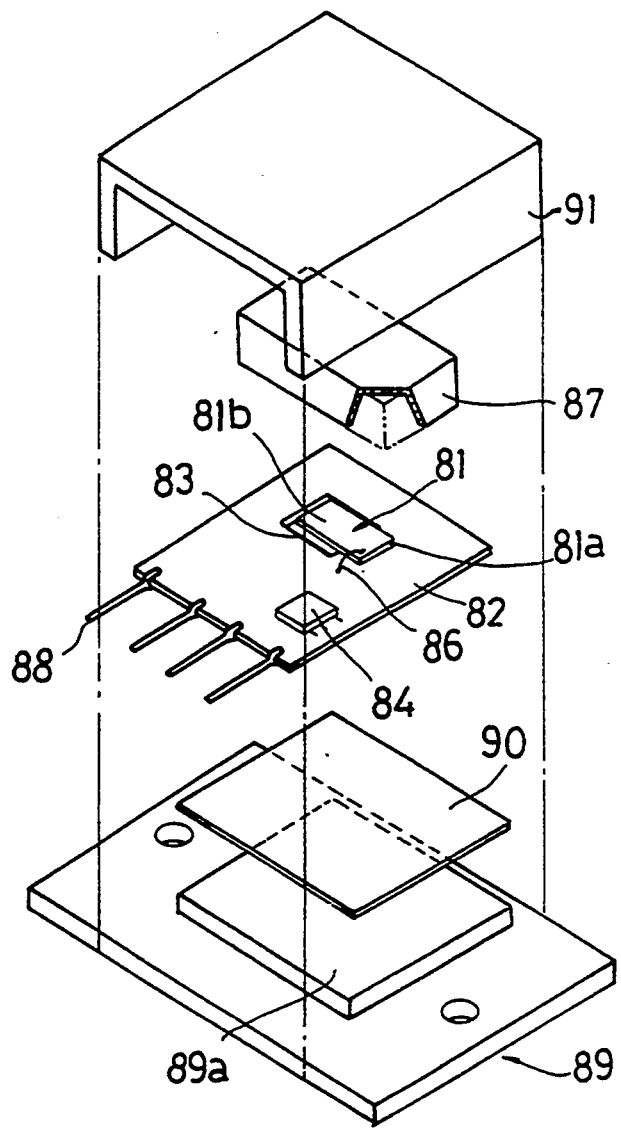
FIG. 17 is an exploded perspective view for explaining the construction of an acceleration sensor according to a fifth embodiment of the present invention.
Figure 18:
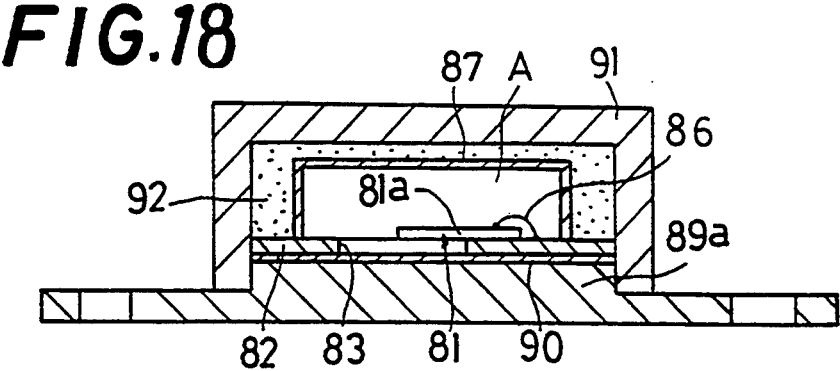
FIG. 18 is a cross sectional view for explaining the construction of the acceleration sensor according to the fifth embodiment.
Figure 19:
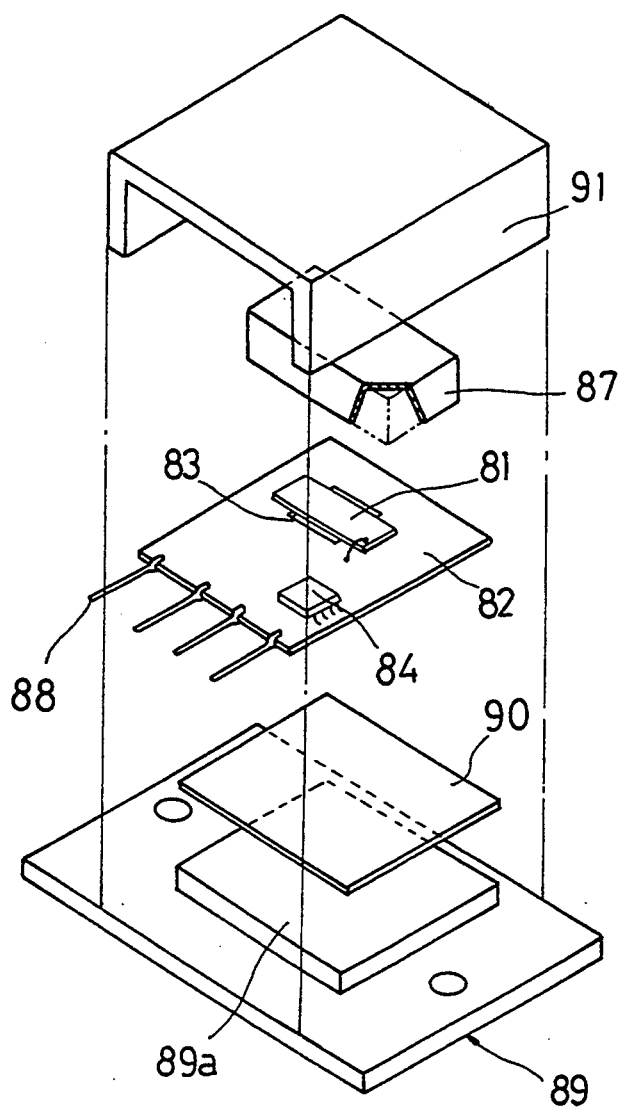
FIG. 19 is an exploded perspective view showing the schematic construction of a modified example of the acceleration sensor according to the fifth embodiment of the present invention.

Referring to FIG. 17, the acceleration sensor according to the present embodiment includes a piezoelectric element 81 outputting an electric signal corresponding to acceleration and a hybrid IC 82 serving as an electronic component containing various types of signal processing circuits for processing a signal outputted from the piezoelectric element 81. The piezoelectric element 81 has a strip shape, and the hybrid IC 82 has a rectangular plate shape.

The piezoelectric element 81 is held in the center of the hybrid IC 82 in a cantilevered arrangement. That is, a through hole 83 for mounting the piezoelectric element is formed in the center of the hybrid IC 82. A fixed end 81a of the piezoelectric element 81 is secured to an edge of the above described through hole 83, and a free end 81b thereof is so arranged as to face the through hole 83.

A tip-type electronic component 84 and a wiring pattern (not shown) are secured or formed on the upper surface of the hybrid IC 82. A component such as a resistor film or a wiring pattern, an electrode and the like are also formed on the bottom surface of the hybrid IC 82, which are not shown. The hybrid IC 82 and the piezoelectric element 81 are connected to each other through a bonding wire 85. In addition, the upper surface of the hybrid IC 82 is covered with a cover body 87 made of a metal, a conductive resin or a material obtained by metal-plating a synthetic resin.

Meanwhile, if the cover body 87 and the wiring pattern (not shown) formed on the hybrid IC 82 are connected to each other by bonding of the cover body 87, it is possible to further enhance the reliability of the electrical connection. A plurality of connecting terminals for connection to outer portions 88 are attached to one end of the hybrid IC 82, and are projected sideward from the hybrid IC 82.

The acceleration sensor according to the present embodiment includes a base plate 89 made of a metal on which the above described hybrid IC 82 is mounted and an insulating resin film 90. This insulating resin film 90 serves as a cushioning member in the present invention.

The base plate 89 includes a mounting stage 89a for mounting the hybrid IC 82 in its central part, and the insulating resin film 90 is affixed on the mounting stage 89a with, for example, epoxy adhesives.

A polymer film such as a polyimide film having a coefficient of thermal expansion of $8 \times 10^{-6}$ to $17 \times 10^{-6}/°C$. and having modulus of elasticity of 380 kg/mm$^2$ and a polyethylene terephthalate film having a coefficient of thermal expansion of $30 \times 10^{-6}$ to $50 \times 10^{-6}/°C$. and having modulus of elasticity of 400 kg/mm$^2$ are suitable as the insulating resin film 90, and approximately 10 $\mu$m is sufficient and particularly, approximately 30 $\mu$m is suitable for the thickness thereof.

The hybrid IC 82 is affixed on the insulating resin film 90 affixed to the mounting stage 89a through, for example, epoxy adhesives. In order to firmly bond the base plate 89, the insulating resin film 90, and the hybrid IC 82, it is preferable that both surfaces of the insulating resin film 90 are previously subjected to sandblasting.

The area above the hybrid IC 82 positioned and fixed on the base plate 89 is covered with a cap 91. The cap 91 is made of a metal or a conductive resin, and has dimensions covering the mounting stage 89a of the base plate 89. In addition, parts on the side of the bottom surface and one side surface of the cap 91 are opened. The lower parts of the side surfaces of the cap 91 are secured to the periphery of the mounting stage 89a so that the cap 91 is fixed on the base plate 89. Consequently, the hybrid IC 82 is covered with the cap 91 in a state where the connecting terminals for connection to outer portions 88 are projected sideward from the opened part of the cap 91. In addition, the cap 91 is filled with an insulating resin 92 such as silicone resin for the purpose of hermetical sealing. Since the piezoelectric element 81 is surrounded by the cover body 87, however, a space for vibration A of the piezoelectric element 81 is ensured.

Furthermore, the hybrid IC 82 contains various circuits as described in the first and second embodiments, for example, signal processing circuits such as an impedance converting circuit, a filter circuit, an amplifying circuit and the like.

Also in the acceleration sensor according to the present embodiment, the hybrid IC 82 and the base plate 89 differ from each other in coefficient of thermal expansion and modulus of elasticity (the coefficient of thermal expansion of the hybrid IC 82 is $2 \times 10^{-6}$ to $7 \times 10^{-6}/°C$. and the modulus of elasticity thereof is $1 \times 10^4$ to $3 \times 10^4$ kg/mm$^2$, while the coefficient of thermal expansion of the base plate made of metal is $10 \times 10^{-6}$ to $30 \times 10^{-6}/°C$. and the modulus of elasticity thereof is $0.1 \times 10^4$ to $2 \times 10^4$ kg/mm$^2$), as in the conventional acceleration sensor. Consequently, when the temperature changes suddenly, a thermal shock can be produced between the hybrid IC 82 and the base plate 89. However, the above described insulating resin film 90 is interposed therebetween, which functions as a cushioning member to absorb the above described thermal shock. Consequently, damage caused by cracking or chipping and stripping in the hybrid IC 82 is presented.

Furthermore, the piezoelectric element 81 is mounted on the hybrid IC 82. The hybrid IC 82 is reliably fixed on the base plate 89 without being stripped by the function of the insulating resin film 90. Consequently, a fault making it impossible to measure acceleration, that is, the stripping of the piezoelectric element 81, does not easily occur.

Additionally, the thermal shock is absorbed by the insulating resin film 90, so that there is no possibility of damaging the wiring pattern or the resistor film formed on the bottom surface of the hybrid IC 82. Similarly, the surface of the wiring pattern or the resistor film is physically protected by the insulating resin film 90. Moreover, the electrical insulation between the bottom surface of the hybrid IC 82 and the base plate 89 is ensured. Accordingly, it is possible to form a more reliable wiring pattern or a resistor film on the bottom surface of the hybrid IC 82, thereby to make it possible to make the hybrid IC 82 smaller in size and higher in integration density.

Although in the above described fifth embodiment, the insulating resin film 90 is used as a cushioning member, the present invention is not limited to the same. For example, insulating adhesives used for bonding can be also used as the above described cushioning member. In this case, the insulating adhesives must be so applied as to have a thickness of at least approximately 10 μm in order to obtain the cushioning effect.

Furthermore, the connecting terminals for connection to outer portions 88 are directly mounted on the hybrid IC 82, and are not mounted on the base plate 89. Consequently, it is possible to omit complicated work such as work of mounting the connecting terminals for connection to outer portions 88 so as to pass through the base plate 89 or work of insulating the connecting terminals for connection to outer portions 88 and the base plate 89 from each other.

Additionally, the above described bonding wire 86 need not be necessarily used so as to connect the piezoelectric element 81 and the hybrid IC 82 to each other. For example, the piezoelectric element 81 and the hybrid IC 82 may be connected to each other using solder, conductive adhesives or the like.

Furthermore, as the piezoelectric element 81, a piezoelectric element of a bimorph type, a piezoelectric element of a unimorph type, and a piezoelectric element of a shear mode type (shearing type) may be used. In the piezoelectric element 81 of a shear mode type, the piezoelectric element 81 and the hybrid IC 82 can be connected to each other without using the bonding wire 86 from a structural point of view.

Although in the embodiment shown in FIG. 17, the piezoelectric element 81 is fixed to the upper surface of the hybrid IC 82 in a cantilevered arrangement, the fifth embodiment is not limited to the same. That is, as shown in an exploded perspective view of FIG. 19, a piezoelectric element 81 may be fixed to a flat upper surface of a hybrid IC 82 so as to support both ends of the piezoelectric element 81 on both sides by edges opposed to each other of a through hole 83 in the hybrid IC 82. In this case, if grooves for positioning the piezoelectric element 81 and mounting the same are provided at both the edges of the through hole 83, the piezoelectric element 81 is easily positioned, and the necessity of making connection by a bonding wire is eliminated by only altering wiring on the hybrid IC 82, thereby to make it possible to further enhance reliability and productivity.

Figure 20:
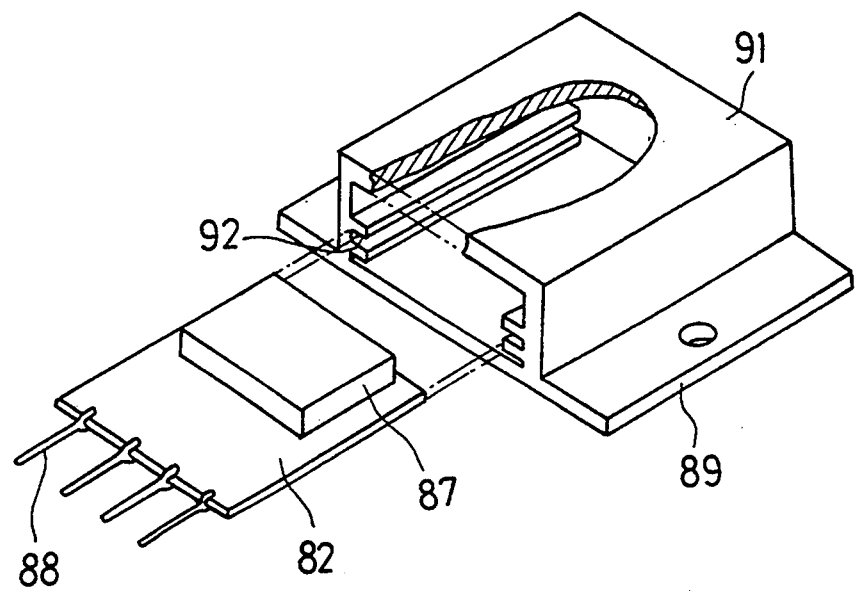
FIG. 20 is an exploded perspective view for explaining another modified example of the acceleration sensor according to the fifth embodiment of the present invention.

Furthermore, as shown in an exploded perspective view of FIG. 20, a base plate 89 and a cap 91 may be integrated, and grooves for positioning 92 may be respectively formed on the inside of a pair of side surfaces opposed to each other so as to extend in the horizontal direction. If the width of the grooves 92 is made approximately equal to the thickness of the hybrid IC 82, it is possible to simply mount the hybrid IC 82. Moreover, it is possible to reliably mount the hybrid IC 82. In addition, the necessity of bonding the base plate 89 and the cap 91 to each other is eliminated, thereby to increase the strength of the entire package structure. A member for preventing silicone resin or the like with which the cap 91 is filled from flowing in is mounted on the reverse surface of a mounting hole of a piezoelectric element (that is, a mounting hole corresponding to the through hole 83 shown in FIG. 17), which is not shown in FIG. 20. In addition, the hybrid IC 82 can be mounted with it being turned over by changing the position of the grooves for positioning 92, which is not shown.

Figure 21:
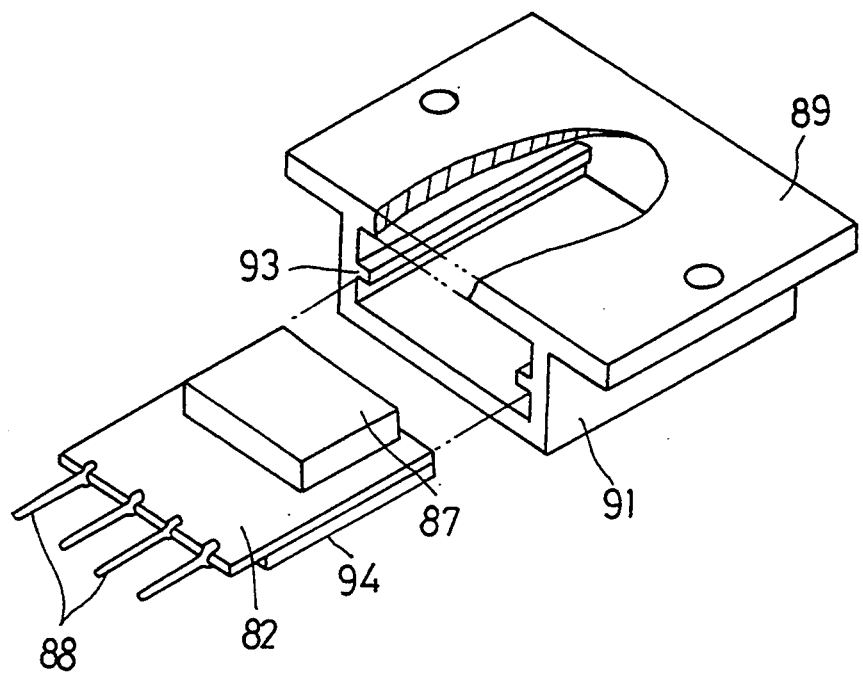
FIG. 21 is an exploded perspective view for explaining still another modified example of the acceleration sensor according to the fifth embodiment.

Additionally, as shown in an exploded perspective view of FIG. 21, the above described grooves for positioning 92 may be replaced with inward projections for positioning 93 extending in the horizontal direction, and the lower surface of the projection 93 may be utilized as a surface for positioning in inserting the hybrid IC 82. In this case, an insulating plate 94 having a predetermined thickness may be affixed to the reverse surface of the hybrid IC 82 so as to obtain positioning on the lower side of the hybrid IC 82. That is, the thickness of the above described insulating plate 94 may be selected so that the thickness of the insulating plate 94 and the thickness of the hybrid IC 82c are approximately equal to the distance between the lower surface of the projection 93 and the bottom surface of the cap 91.

Meanwhile, in the above described all embodiments, it is possible to use, as the piezoelectric element, a suitable piezoelectric element such as not only a piezoelectric element of a bimorph type but also a piezoelectric element of a unimorph type, a piezoelectric element of a shear mode type or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An acceleration sensor comprising:
   an acceleration detecting portion comprising a piezoelectric element having electrodes on both its surfaces for outputting a signal corresponding to acceleration applied thereto and a supporting base for supporting said piezoelectric element;
   said acceleration detecting portion being provided with a pair of detecting portions arranged so as to be brought into contact with said piezoelectric element and spaced apart from each other by a predetermined distance;

a signal processor electrically connected to one of the electrodes of said piezoelectric element and for processing the electric signal outputted from the piezoelectric element; and a signal outputting device electrically connected to one of said pair of detecting portions so as to cause a predetermined current to flow between said detecting portions and connected to said signal processor so as to output to the signal processor a state signal representing the state of the acceleration detecting portion, said signal outputting device outputting said state signal in conformity with the variation of the current flowing between the detecting portions.

2. The acceleration sensor according to claim 1, wherein said pair of detecting portions is provided between said piezoelectric element and the supporting base.

3. The acceleration sensor according to claim 2, wherein said supporting base is constituted by a pair of supporting members arranged spaced apart from each other by a predetermined distance, an electrode constituting said pair of detecting portions being formed on the upper surface of said pair of supporting members.

4. The acceleration sensor according to claim 3, wherein said pair of supporting members is arranged so as to support the piezoelectric element in both ends of the piezoelectric element or in the vicinity thereof.

5. The acceleration sensor according to claim 2, wherein said supporting base is arranged so as to support the piezoelectric element in one end of the piezoelectric element or in the vicinity thereof, a pair of electrodes constituting said pair of detecting portions arranged spaced apart from each other by a predetermined distance being formed on the upper surface of said supporting base.

6. The acceleration sensor according to claim 1, wherein said signal processor comprises:

an impedance converter electrically connected to the piezoelectric element for converting an impedance of the signal outputted from the piezoelectric element to an impedance that matches an impedance of the signal processor;

a filter electrically connected to the impedance converter for removing an unnecessary signal component, and an amplifier electrically connected to said filter for amplifying a signal applied from the filter.

7. The acceleration sensor according to claim 1, wherein at least a part of said signal processor is constituted by a single electronic component having a flat upper surface, said piezoelectric element being fixed to said upper surface of said electronic component in a cantilevered arrangement.

8. The acceleration sensor according to claim 1, which further comprises a temperature compensating capacitor arranged in close proximity to said piezoelectric element and connected in parallel to the piezoelectric element.

9. The acceleration sensor according to claim 1, wherein at least a part of said signal processor is constituted by a single electronic component, and which further comprises a base plate for supporting said electronic component, a cushioning member for absorbing a thermal shock produced between the base plate and said electronic component due to the difference in coefficient of thermal expansion or modulus of elasticity being arranged between the base plate and the electronic component.

10. An acceleration sensor according to claim 6, further comprising:

an electric component constituting at least a part of said signal processor having a flat upper surface, said electronic component having an electrode electrically connected to the piezoelectric element, said electrode being located on an upper surface of the electronic component, said piezoelectric element being fixed to the upper surface of the electronic component in a cantilevered arrangement.

11. The acceleration sensor according to claim 10, which further comprises a package structure for containing said electronic component and the piezoelectric element, said package structure comprising a base plate and a cap secured to the base plate, said electronic component being secured on said base plate.

12. The acceleration sensor according to claim 10, which further comprises a temperature compensating capacitor arranged in close proximity to said piezoelectric element and connected in parallel to the piezoelectric element.

13. The acceleration sensor according to claim 10, wherein at least a part of said signal processor is constituted by a single electronic component, and which further comprises a base plate for supporting said electronic component, a cushioning member for absorbing a thermal shock produced between the base plate and said electronic component due to the difference in coefficient of thermal expansion or modulus of elasticity being arranged between the base plate and the electronic component.

* * * * *